United States Patent [19]
Klyosov et al.

[11] Patent Number: 6,156,226
[45] Date of Patent: Dec. 5, 2000

[54] LIQUID AND SOLID DE-ICING AND ANTI-ICING COMPOSITIONS AND METHODS FOR MAKING SAME

[75] Inventors: Anatole A. Klyosov, Newton; George P. Philippidis; Alan M. James, both of Boston; Yiannis A. Monovoukas, Waltham, all of Mass.

[73] Assignee: Thermo Fibergen, Inc., Bedford, Mass.

[21] Appl. No.: 09/246,192

[22] Filed: Feb. 2, 1999

Related U.S. Application Data

[60] Provisional application No. 60/088,766, Jun. 10, 1998.
[51] Int. Cl.$^7$ ................................................. C09K 3/18
[52] U.S. Cl. .................................... 252/70; 106/13
[58] Field of Search ............................... 252/70; 106/13

[56] References Cited

U.S. PATENT DOCUMENTS

| | | | |
|---|---|---|---|
| 2,980,620 | 4/1961 | Hatch et al. | 252/70 |
| 3,624,243 | 11/1971 | Scott, Jr. et al. | 252/70 |
| 4,108,669 | 8/1978 | Otrhalek et al. | 106/13 |
| 4,202,796 | 5/1980 | Jacob et al. | 252/389 |
| 4,243,415 | 1/1981 | Lowe, Jr. | 106/13 |
| 4,283,297 | 8/1981 | Peters et al. | 252/70 |
| 4,358,389 | 11/1982 | Konig-Lumer et al. | 252/70 |
| 4,377,488 | 3/1983 | Ganey | 252/70 |
| 4,382,008 | 5/1983 | Boreland et al. | 252/70 |
| 4,388,203 | 6/1983 | Nimerick et al. | 252/70 |
| 4,512,907 | 4/1985 | McConnell | 252/70 |
| 4,587,028 | 5/1986 | Darden | 252/76 |
| 4,588,513 | 5/1986 | Triebel et al. | 252/75 |
| 4,592,853 | 6/1986 | Darden et al. | 252/75 |
| 4,597,884 | 7/1986 | Greenwald | 252/70 |
| 4,606,835 | 8/1986 | Lieber et al. | 252/70 |
| 4,636,467 | 1/1987 | Chynoweth | 435/140 |
| 4,647,392 | 3/1987 | Darden et al. | 252/75 |
| 4,654,157 | 3/1987 | Fukunaga | 252/70 |
| 4,664,832 | 5/1987 | Sandvig et al. | 252/70 |
| 4,668,416 | 5/1987 | Neal | 252/70 |
| 4,676,918 | 6/1987 | Toth et al. | 252/70 |
| 4,698,172 | 10/1987 | Tye et al. | 252/70 |
| 4,728,393 | 3/1988 | Peel | 162/29 |
| 4,744,913 | 5/1988 | Salvador et al. | 252/70 |
| 4,803,007 | 2/1989 | Garber | 252/70 |
| 4,824,588 | 4/1989 | Lin | 252/70 |
| 4,849,171 | 7/1989 | Murray | 422/7 |
| 4,855,071 | 8/1989 | Todd, Jr. et al. | 252/70 |
| 4,869,841 | 9/1989 | Matteodo et al. | 252/79 |
| 4,936,915 | 6/1990 | Canzani | 106/13 |
| 4,954,279 | 9/1990 | Ma et al. | 252/70 |
| 4,978,500 | 12/1990 | Murray | 422/7 |
| 4,986,925 | 1/1991 | Fiske | 252/70 |
| 4,990,278 | 2/1991 | Wyeth | 252/70 |
| 5,039,439 | 8/1991 | Hansman, Jr. et al. | 252/70 |
| 5,064,551 | 11/1991 | Smith | 252/70 |
| 5,064,552 | 11/1991 | Oppeniaender et al. | 252/78.3 |
| 5,080,818 | 1/1992 | Tachiiwa et al. | 252/75 |
| 5,104,562 | 4/1992 | Kardos et al. | 252/76 |
| 5,118,435 | 6/1992 | Nieh | 252/70 |
| 5,132,035 | 7/1992 | Hoenke et al. | 252/70 |
| 5,135,674 | 8/1992 | Kuhajek et al. | 252/70 |
| 5,238,592 | 8/1993 | Stankowiak et al. | 252/70 |
| 5,242,621 | 9/1993 | Miller et al. | 252/396 |
| 5,296,167 | 3/1994 | Murray | 252/387 |
| 5,302,307 | 4/1994 | Ireland | 252/70 |
| 5,324,442 | 6/1994 | Mathews | 252/70 |
| 5,350,533 | 9/1994 | Hubred et al. | 252/70 |
| 5,366,651 | 11/1994 | Maes et al. | 252/76 |
| 5,376,292 | 12/1994 | Lucas | 252/70 |
| 5,376,293 | 12/1994 | Johnston | 252/70 |
| 5,386,968 | 2/1995 | Coffey et al. | 252/70 |
| 5,389,276 | 2/1995 | Coffey et al. | 252/70 |
| 5,411,668 | 5/1995 | Pollmann et al. | 210/638 |
| 5,461,100 | 10/1995 | Jenkins et al. | 524/388 |
| 5,498,362 | 3/1996 | Mathews | 252/70 |
| 5,531,931 | 7/1996 | Koefod | 252/387 |
| 5,561,916 | 10/1996 | Willgohs | 34/363 |
| 5,645,755 | 7/1997 | Wiesenfeld et al. | 252/70 |
| 5,651,915 | 7/1997 | Ossian et al. | 252/70 |
| 5,683,619 | 11/1997 | Ossian et al. | 252/70 |
| 5,730,371 | 3/1998 | Dongieux, Jr. et al. | 241/27 |

OTHER PUBLICATIONS

Derwent Abstact No. 1988–103618, abstract of Soviet Union Patent No. 1323636. (Jul. 1987).

*Primary Examiner*—Anthony Green
*Attorney, Agent, or Firm*—Testa, Hurwitz & Thibeault, LLC

[57] ABSTRACT

Liquid and solid de-icing and anti-acing agents comprise neutral or alkaline, non-chloride, non-phosphate and non-glycol compositions that are biodegradable, non-toxic, and environmentally benign. Liquid compositions are based on aqueous solutions of one or more organic acid salts such as lactic acid, succinic acid, acetic acid, and formic acid salts (preferably potassium or sodium). Solid compositions comprise organic-based porous pulp and paper sludge granules impregnated with a liquid de-icing composition or its ingredient(s), and dried. The liquid compositions can be obtained either by direct mixing of commercially available chemicals, or by chemical transformation of commercially available acids, or by fermentation of glucose, sucrose, fructose, or other sugars, or combination thereof.

14 Claims, No Drawings

6,156,226

LIQUID AND SOLID DE-ICING AND ANTI-ICING COMPOSITIONS AND METHODS FOR MAKING SAME

RELATED APPLICATION

The present application claims priority from provisional application Ser. No. 60/088,766, filed Jun. 10, 1998.

FIELD OF THE INVENTION

The present invention relates to ice-melting compositions, and in particular to compositions utilizing renewable resources and industrial wastes.

BACKGROUND OF THE INVENTION

1. Anti-Icing and De-Icing Compositions

Various de-icers (ice melters) have been studied for many years. Nonetheless, the compositions developed to date suffer from various disadvantages. The predominant de-icer remains sodium chloride, with its well known highly corrosive and environmentally deleterious properties. Approximately ten million tons of sodium chloride are used annually on roadways in the United States for de-icing purposes. Other more or less common de-icers either contain chlorides or phosphates and therefore are not environmentally safe and not acceptable by many local ordinances, or corrosive to steel and/or aluminum, or contain health-threatening compounds such as ethylene glycol, or are too inefficient, or too expensive (e.g., acetates, which cost about 20 to 30 times more than de-icers based on sodium chloride, and therefore are not practical for large-scale applications).

A desirable de-icing agent, liquid or solid, should possess a high ice-melting and ice-penetration capability (not less than that of sodium chloride or, better, calcium chloride), be a potent freezing point depressant (particularly when applied at subzero temperatures; it should be noted in this regard that sodium chloride is not a potent freezing point depressant, and can perform well at temperatures down to only about $-6°$ C., or $+21°$ F.), be readily biodegradable (if based on organic matter) and cause no damage to soil and its microflora, be physiologically acceptable to humans, animals, and fresh water basin inhabitants, produce no offensive smell and fire danger, be non-corrosive on metals (primarily, on iron and aluminum alloys, or whatever metals the de-icer practically comes into contact with; being non-corrosive in this context means does not cause weight loss of tested materials within experimental error, if widely accepted experimental protocols are followed, and/or does not cause rust formation on surface of tested steel coupons and in their test solutions, or blackening of aluminum or its alloys test coupons), and/or serve as an inhibitor of corrosion caused by water or other chemical agents. Furthermore, the de-icing agent should be affordable for the targeted applications (streets and roads, steel bridges, private driveways, walkways, railroad station platforms, concrete structures, runways, aircrafts, and the like). Hence, there is a wide selection of suggested de-icers and their compositions in the prior art.

Sodium acetate or potassium acetate (also calcium acetate and magnesium acetate) have been suggested in many studies as principal components of ice-melting compositions. U.S. Pat. Nos. 5,064,551 and 5,238,592 describe compositions comprising about 98% or more of acetates among all dissolved chemicals, concentration of acetates in water solution being from 15 to 70%, and preferably 25 to 60% by weight (U.S. Pat. No. 5,238,592), from 45% to 60%, and preferably at 50–53% (U.S. Pat. No. 5,064,551, European Patent Application No. 0375214), from 0.5% to 16% (U.S. Pat. No. 4,388,203), from 12% to 75% (U.S. Pat. No. 4,728,393), or from 40% to 60% (U.S. Pat. No. 5,350,533) by weight. U.S. Pat. No. 5,376,293 describes as a de-icer the crystalline double salt comprising from 25 to 75% w/w of sodium acetate and from 75 to 25%, respectively, of sodium formate. U.S. Pat. No. 5,104,562 describes a coolant composition, comprising of a mixture of potassium acetate and potassium formate as 40 to 60% w/w total concentrations in water (with potassium acetate from 1 to 9 parts by weight, and potassium formate from 1 to 2 parts in from 5 to 23 parts total by weight, including water).

U.S. Pat. No. 4,377,488 discloses a calcium acetate-based de-icing agent. U.S. Pat. Nos. 5,324,442 and 5,498,362 describe road de-icers comprising acetate salts of calcium and magnesium, and mixed calcium magnesium acetate (CMA, 25–40% by weight) and calcium magnesium propionate (50–75% by weight). The compositions were produced by treating water plant primary sedimentation basin residues (containing calcium and magnesium compounds) with acetic acid or a mixture of acetic and propionic acids, obtained either by fermentation (U.S. Pat. No. 5,324,442) or by other means (U.S. Pat. No. 5,498,362). CMA-based de-icers were also described in U.S. Pat. No. 4,636,467, which discloses a process for production of mixed calcium-magnesium acetate by anaerobic fermentation, and in U.S. Pat. No. 5,132,035.

U.S. Pat. No. 4,664,832 discloses a de-icer composition manufactured by reacting sodium carbonate with sawdust or other cellulosic biomass at high temperature and pressure, and containing, as a result of autohydrolysis and the subsequent chemical treatment, sodium salts of acetic, formic, and glycolic acids. U.S. Pat. No. 4,728,393 describes a de-icing product manufactured using black liquor obtained from a pulp mill operation, and comprising acetate salts, carbonate salts, formate salts, and pseudolactate salts.

Typically, disclosed de-icing formulations contain added buffer substances and/or corrosion inhibitors such as imidazole and/or triazole derivatives (e.g., U.S. Pat. Nos. 4,202, 796, 4,382,008, 4,588,513, 4,592,853, 5,104,562, 5,238,592, 5,366,651), phosphates (e.g., U.S. Pat. Nos. 5,064,551, 5,238,592, 5,350,533, European Patent Application No. 0375214), soluble silicates (U.S. Pat. No. 5,350,533), nitrites (U.S. Pat. No. 5,064,551, European Patent Application No. 0375214), or other additives such as urea (U.S. Pat. No. 5,104,562), EDTA (U.S. Pat. Nos. 5,064,551, 5,132, 035), sodium or potassium formate (U.S. Pat. Nos. 4,728, 393, 5,064,551, 4,728,393, European Patent Application No. 0375214), glycols (U.S. Pat. No. 4,388,203), chlorides (U.S. Pat. No. 4,388,203), carbonates, pseudolactates from black liquor (U.S. Pat. No. 4,728,393), or unspecified amount of glycolic acid and/or lactic acid salts (U.S. Pat. No. 5,376, 293). Some of these de-icer components are viewed by many as inefficient or environmentally damaging. Urea, for example, is ineffective as a de-icing agent at temperatures below $-8$ to $-10°$ C., is not a potent freezing point depressant, is corrosive, does promote the growth of weeds and algae in water basins, and readily decomposes into ammonia which is toxic to fish even in low concentration (see U.S. Pat. No. 5,064,551). The autohydrolysis composition, disclosed in U.S. Pat. No. 4,664,832 (mentioned above), has limited ice-penetration capability, significantly below that for sodium chloride under similar test conditions (see U.S. Pat. No. 5,376,293). Similarly, sodium formate is not as effective as sodium chloride as a de-icer, and is corrosive (see U.S. Pat. No. 5,376,293).

Glycols are often resistant to biodegradation and hence present problems of pollution and contamination of water basins. Calcium magnesium acetate (CMA) is very dusty when dry, and spontaneously generates free acetic acid, even at pH levels as high as 9 (see U.S. Pat. No. 5,376,293). Moreover, the cost of CMA, which is produced by reacting dolomite with acetic acid (e.g., U.S. Pat. Nos. 4,636,467 and 4,855,071), is about twenty times or more than that of sodium chloride (see U.S. Pat. No. 5,324,442). Phosphates and nitrites have been barred by local ordinances in some areas because they are not environmentally safe (see U.S. Pat. No. 5,645,755). Nitrates as de-icers or their ingredients also are not desirable from an enviromental viewpoint (dangerous for sewage, and cause explosion hazard when dried, particularly in the presence of organic compounds). Ammonium salts as de-icers, similarly, cannot meet common environmental requirements concerning $NH_4^+$ content in non-aggressive waters (should be less than 15 mg per liter $H_2O$, see U.S. Pat. No. 4,448,702). De-icing agents are applied on traffic surfaces to be treated in an amount, in general, ranging from 10 to 100 g/m$^2$ of ice- and/or snow-covered surface, depending on the outside temperature and the amount of ice and/or snow present (see, e.g., U.S. Pat. No. 5,238,592).

Salts of dibasic acids, such as an industrially obtained blend of adipic acid (30–35% w/w), glutaric acid (40–50% w/w), and succinic acid (20–25% w/w) have been recommended as an antifreeze solution in U.S. Pat. No. 4,448,702. These mixtures have been reported to provide very good corrosion prevention on metallic materials, such as cast iron, at pH levels of 7.5–7.8. However, while such compositions may be suitable for use in connection with heat/cold exchangers (coolers, radiators, as antifreeze compositions for internal combustion engines at temperatures ranging from –20° C. to +100° C.), anti-freeze and coolant compositions have different areas of practical application as compared with de-icers. Normally, antifreezes and coolants are not spread over land, streets, walkways, etc.; hence, requirements as to use, compositions, concentrations, viscosity, pH, types of corrosion inhibitors, etc. are different from those required for de-icers. Modes of characterization, test protocols, targeted functional parameters for antifreezes/coolants, on the one hand, and for ice-melting agents, on the other, are also different. Typically, the prior art in the area of antifreeze and coolant compositions does not provide any information on the ice-melting capacity of those compositions (e.g., dicarboxylic acid-based anti-freezes). The same is true with respect to the prior art in the area of aircraft de-icers and anti-icers.

Inorganic chlorides (such as sodium chloride, calcium chloride, magnesium chloride, potassium chloride, and combination thereof), in spite of their recognized potential for damage to the environment, continue to be offered as principal components of ice-melting agents. U.S. Pat. No. 5,645,755, for example, describes a composition comprising 80% sodium chloride, 18% magnesium chloride, and 2% calcium chloride by weight, combined with other additives and/or corrosion inhibitors such as 2-butyne-1,4-diol, urea, ammonium sulfate, fumaric acid, alkyl amine, oximine, or others. U.S. Pat. No. 5,531,931 discloses a sodium chloride-based composition, containing up to 25% w/w of magnesium chloride or calcium chloride, in combination with corrosion inhibitors such as either lanthanum salt, or salts of gluconic, ascorbic, tartaric, or saccharic acid. Gluconate and/or sorbitol are disclosed as corrosion inhibitors in sodium chloride brine solutions in U.S. Pat. No. 5,330,683. U.S. Pat. No. 4,654,157 discloses an ice-melting agent comprising a mixture of calcium chloride, magnesium chloride, and magnesium sulfate in various combinations. U.S. Pat. Nos. 4,803,007, 4,978,500, 5,296,167 describe sodium chloride- and calcium chloride-based compositions containing a mixture of phosphates as corrosion inhibitors. U.S. Pat. No. 4,512,907 describes an ice melter comprising sodium and/or potassium chloride mixed with urea and dried. U.S. Pat. No. 5,302,307 discloses a liquid de-icing composition comprising magnesium chloride and organic corrosion inhibitors such as triethanolamine, citric acid, and mixtures thereof. De-icing compositions comprising magnesium chloride and a polyphosphate salt or orthophosphate as corrosion inhibitors are disclosed in U.S. Pat. Nos. 4,990,278 and 5,211,868, respectively. U.S. Pat. No. 5,376,292 describes a de-icing composition comprising sodium chloride and water-soluble ferrocyanide or ferricyanide salt. U.S. Pat. No. 5,135,674 discloses a sodium chloride de-icer composition including between about 0.5% and 5% w/w of hydroxyethyl cellulose to minimize spalling of concrete to which the de-icing composition is applied. U.S. Pat. No. 4,824,588 describes a de-icing composition comprising sodium chloride, magnesium chloride, calcium chloride, or mixtures thereof, and saccharinic acid and lignosulfonate, the ratio of chloride and lignosulfonate being from about 16:1 to 1:2.25. Similarly, U.S. Pat. No. 4,668,416 describes a de-icing agent comprising sodium chloride, magnesium chloride, and/or calcium chloride and spent sulfite liquor, so that the ratio of chloride to lignosulfonate solids ranges from about 25:1 to 1:15. U.S. Pat. No. 4,986,925 discloses a de-icing agent comprising sodium chloride, lignosulfonate, and corrosion inhibitors. U.S. Pat. No. 4,676,918 discloses an ice-melting agent comprising a waste concentrate of alcohol distilling industry, 20 to 90% w/w of dry substance in water.

The prior art also discloses a number of solid de-icers applied onto a solid carrier, comprising, as a rule, sodium chloride and calcium chloride compositions. U.S. Pat. No. 4,849,171 describes such compositions in granular form, coated with superphosphate as a corrosion inhibitor, and magnesium oxide. U.S. Pat. No. 4,606,835 discloses a solid composition comprising chlorides, alcohols, bentonite and sodium metasilicate. Sodium chloride- and calcium chloride-based de-icers, pan agglomerated to form solid composition, are disclosed in U.S. Pat. No. 5,211,869. U.S. Pat. No. 4,377,488 describes a de-icing agent prepared by adding coarse limestone to calcium acetate solution in amounts up to 10% by weight and converting the solution into solid flakes. U.S. Pat. Nos. 5,599,475, 5,651,915, and 5,683,619 disclose calcium chloride-coated compositions used as solid de-icers (sodium chloride, potassium chloride, and urea), mixed with abrasives (sand, gravel) and absorbents (bentonite).

The prior art also describes other, less common road de-icers, such as inorganic nitrates (magnesium, calcium, ammonium, e.g., U.S. Pat. No. 4,108,669), inorganic phosphates (sodium, potassium, ammonium), ammonium sulfate, and low-molecular organic de-icers such as alcohols, glycols (e.g., U.S. Pat. Nos. 4,283,297, 4,597,884, 4,606,835), glycerin, urea (e.g., U.S. Pat. Nos. 4,283,297, 4,448,702, 4,597,884). German Patent No. 1459639 describes blends of formamide or its derivatives, low-molecular alcohols and glycolic ether for providing quick ice melting on solid surfaces. However, according to current knowledge formamide should not be used any longer in ice-melting compositions on account of its damaging effect to health (see U.S. Pat. No. 4,448,702). Czechoslovak Patent No. 184 118 describes mixtures based on ethanol and urea as ice-melters for airfields and streets, U.S. Pat. No. 3,624,243 recommends mixes of urea and ammonium nitrate with ethylene glycols as a de-icing liquid, and U.S. Pat. No. 2,980,620 describes ice-melting blends of ammonium sulfate, urea, and sodium nitrate with some corrosion inhibitors. The negative impact of these primary ingredients has been outlined above.

2. Pulp and Paper Sludge

Pulp and paper sludge (a byproduct of primary pulping operations, papermaking operations, recycle streams or waste paper pulping and the like) represents an environmental and disposal problem for manufacturers of pulp and paper. Generally, pulp and paper sludge is unsuitable for paper making, although it generally contains the same components— cellulose, lignin, hemicellulose, calcium carbonate, clay, and other inorganic components—as those present in the paper pulp itself. Paper sludge has traditionally been disposed of by landfilling, composting, incorporation into cement, and incineration. The latter option, in turn, creates another problem, namely, disposal of the resulting ash, a mixture of mineral components, which often constitutes up to 50% (and sometimes as much as 80% or higher) of the volume of the sludge itself.

The principal mineral components of pulp and paper sludge are calcium carbonate, in the form of precipitated calcium carbonate (PCC) or ground calcium carbonate (GCC), that typically constitutes 20% and up to 75% of dry sludge content, and clay. These two minerals are typically loaded into paper as a coating and filler to improve the mechanical characteristics as well as the appearance of paper. As a result, pulp and paper sludge, particularly mixed office paper sludge, consists of two major components, that is fiber and minerals, finely mixed with each other.

A typical recycling mill processes 600 tons of wastepaper per day, yielding 450 tons of pulp and producing 150 tons of pulp and paper sludge. Approximately 650 virgin and recycling mills currently under operation in North America, produce 9 million tons of pulp residue, 5 million tons of which is cellulose. 350 European pulp and paper mills, also virgin and recyclien, produce about 8 million tons of pulp residue, approximately 4 million tons of which is cellulose. The conversion of such waste material into value-added products has long been considered as a desirable goal.

One such application relevant to the present invention is granulation of pulp and paper sludge, as described in U.S. Pat. No. 5,730,371. GranTek Inc. (Green Bay, Wis.) manufactures controlled size dust-free granules, made of pulp and paper sludge, under the brand name BIODAC. The granules are a tight composite of organic and inorganic materials, that is cellulose fiber and minerals, and possess a developed porous structure. Another use of pulp and paper sludge, namely, a high-yield method for conversion of its cellulose component into glucose, is described in copending application Ser. No. 09/006,631, filed Jan. 13, 1998.

DESCRIPTION OF THE INVENTION

Brief Summary of the Invention

The present invention relates to liquid and solid de-icers with reduced corrosion and/or anti-corrosion properties, depending on the nature of the metal (steel or aluminum) with which they come in contact, as well as the nature and amount of the ingredients therein. In one embodiment of the invention, the disclosed composition is produced and applied in a liquid form, and is formulated as a mixture of salts of organic acids (primarily lactic acid and acetic acid, but also succinic acid and formic acid). In the preferred embodiment, the ice-melting chemicals (organic acid salts) represent 100% by weight of the liquid ice-melting composition.

We have found that compositions of organic acids, particularly lactic, succinic, acetic, and formic acids, over a broad range of concentrations, possess strong ice-melting and anti-corrosion properties, and show substantial freezing point depressions and excellent ice penetration characteristics. These compositions may be obtained by fermentation of sludge-derived glucose or commercially available glucose, fructose or sucrose, or by simple mixing and/or neutralization of commercially available organic acids and/or their salts.

In another embodiment of the invention, the ice-melting composition or its individual organic acid salt(s) is deposited into the pores of a rigid granular material made from pulp and paper sludge (and produced and applied in a dry form). It has been found that granulated pulp and paper sludge, upon impregnation with salts of such organic acids and/or compositions based thereon, absorbs these to such a large extent that the resulting dried loaded fiber-clay/mineral granules can be used as efficient solid de-icers. In the preferred embodiment, the ice-melting chemicals (organic acid salts) represent 30% to 50% by weight of the solid granular ice-melting composition. The solid composition, when applied directly on ice surface, starts to perforate ice within 2–3 minutes at temperatures as low as −10 to −15° C. (5–15° F.), then melts down through the ice to the underlying hard surface and spreads out underneath. That action undercuts and loosens the ice and eases its removal. Moreover, the hard granules of the solid de-icer imbed into the ice sheet and thereby provide good traction.

Detailed Description of the Preferred Embodiments

Liquid de-icing compositions in accordance with the present invention are typically made either by direct mixing of one or more organic acid salts, or by neutralizing an aqueous mixture of carboxylic and/or dicarboxylic acids or salts thereof with at least one compound selected from the group consisting of sodium carbonate, sodium hydroxide, potassium carbonate, and potassium hydroxide, wherein the final pH is adjusted to a level ranging from about 7 to about 11; or by fermentation of glucose, fructose, sucrose, or other sugar or mixture thereof to a mixture of said organic acid salts, with subsequent concentration of the mixture so that the ice-melting chemical represents from about 20% to about 60% thereof by weight and adjustment of the pH to a level ranging from about 7 to about 11.

Solid granulated de-icers are obtained in accordance with the present invention using granulated pulp and paper sludge (e.g., the BIODAC material mentioned above). BIODAC granules are dust-free and manufactured in various sizes; a preferred size range for the present application is 100 mesh (0.15 mm) to 5 mesh (4 mm). Since BIODAC granules have a highly developed porous infrastructure, and are able to absorb a high amount of liquid (generally more than 100% by weight), they represent desirable carriers for solid de-icing agents. In the preferred embodiment, BIODAC granules are impregnated with one or more liquid de-icer compositions as described above (having concentrations of 30% w/w to 60% w/w), and dried. Typically, impregnation increases the weight of the dry loaded granules is up to 140%–190%, which corresponds to a loading level of about 30% to 47% by weight. The loaded granules melt ice very quickly. It was found that when placed on ice surface, the loaded granules become wet in as little as 2–3 min even at temperatures as low as 5–10° F. (−12° C. to 15° C.). Apparently, this results from contact between the outer layer of the de-icing chemicals and ice. Dissolution of the loaded de-icing chemicals in the absorbed water immediately follows, and in a matter of several minutes the ice surface becomes perforated by granules embedded within the ice, thereby also providing good traction. This effect is accompanied by melting through the ice to the underlying hard surface, with the de-icing solution spreading out beneath the ice. This undercuts and loosens the ice sheets and eases ice removal.

In another preferred embodiment, BIODAC granules were treated with dilute acids (e.g., hydrochloric, nitric, or acetic) in molar amounts close to that of of calcium carbonate in the granules (as described, for example, in the '548 application), and under conditions such that the dilute acid added is completely absorbed by the granules with no extra liquid formed. Since BIODAC granules contain about 24% of calcium carbonate by dry weight, the chemically transformed material contains corresponding amounts of calcium chloride, nitrate, or acetate—all known as de-icers—at levels of 11%, 64%, and 58%, respectively, higher than the initial weight levels (and representing 26%, 39%, and 38%, respectively, of the total de-icing salt load). The acid-treated BIODAC completely retains its granular structure, and can be used directly as a solid de-icer following drying.

Laboratory tests support the utility of the present invention. In these tests, the liquid formulations involving double salts of lactic and acetic acids, as well as blends of lactic, acetic, formic and succinic acid salts (preferably sodium or potassium salts) showed excellent ice-melting and ice-penetration capabilities, along with potent freezing-point depression capabilities. For example, double salts of lactic and acetic acids are readily dissolved in concentrations such that the resulting liquid formulations melt ice faster than saturated solutions of calcium chloride or sodium chloride, primarily because of lower chloride solubility. These and other examples of ice-melting and ice-penetrating capability of the liquid de-icers disclosed herein are described in greater detail below.

In another series of laboratory tests, directed toward measurement of freezing-point depression by liquid de-icing formulations disclosed herein, it was found that formulations in the concentration range of 40%–50% by weight can typically depress the freezing point of their water solutions to levels ranging about –35 to –40° C. (–30 to –40° F.) to below –50° C. (i.e, below –60° F.). This is significantly lower than that obtainable with conventional de-icers, such as saturated solutions of sodium chloride (–20 to –25° C.), or calcium chloride (–27° C.), or urea (–12° C. for 50% w/w solution).

In yet another series of laboratory tests, solid granular de-icers, loaded with the dry components of liquid de-icers discussed above have shown excellent performance with respect to ice melting. The granules start to perforate ice within 2–3 min after being placed on ice surface, at as low as –10 to –15° C. (5–10° F.), and immediately imbed into the ice sheet, providing good traction. This behavior differs from that occuring when mixtures of solid de-icing chemicals and hard inert fillers (sand, corn grits, etc.) are applied on ice surface, since such filler particles do not participate in the ice-melting action.

Solid granular de-icers, produced by acid treatment of BIODAC granules (and thereby loaded with calcium chloride, calcium nitrate, or calcium acetate), though less efficient compared with BIODAC loaded with salts of organic acids (such as sodium lactate, potassium acetate, or their blends), can be also used as solid de-icing agents. Examples of the ice-melting and ice-penetrating capabilities of such granules are described in detail below.

The corrosion potentials of the liquid de-icing formulations disclosed herein as well as those of a wide selection of other comparative de-icing agents have also been evaluated as described in the examples below. The corrosivity of various de-icers was measured using an immersion laboratory test employing cold rolled steel coupons (C1018) and aluminum alloy coupons (A7075), which were placed into aerated water or into aerated water-based 3% (by dry weight) solutions of the de-icers of the present invention. The aluminum alloy (ca. 90% aluminum, 5.6% zinc, 2.5% magnesium, 1.6% copper, and 0.23% chromium) is commonly used as a staple material for airframe construction. Eight coupons were suspended by a rod pushed through 3/16" holes, and immersed in 750-mL testing solutions. Aeration continued around-the-clock during all corrosion experiments, typically for a 6-week period, and sometimes for 2-, 3-, or 4-week runs. The aerated solutions were not replaced throughout the corrosion experiments. At the end of each testing period (typically following 1, 2, 3, 4, and 6 weeks), from two to four coupons were removed, brushed and chemically cleaned as described below in EXPERIMENTAL PROCEDURES, Section 9, dried, weighed, and the weight loss was recorded. Since the weight loss typically progresses with the duration of the corrosion experiment, the final data were reported as weight loss in mil per year (mpy). It was found that the de-icing formulations of the present invention are much less corrosive on both steel and aluminum compared with more conventional de-icers. For example, unlike sodium chloride and calcium chloride, which cause aluminum coupons to undergo severe blackening and steel coupons to undergo significant weight loss (515 mg after 6 weeks and 188 mg after 3 weeks for sodium chloride at an initial pH of 5.2 and 8.0, respectively, and 429 mg after 6 weeks for calcium chloride at an initial pH of 8.0), sodium lactate did not produce any visible signs of corrosion on steel at all pH levels tested, and lactates, acetates, succinates, and their combinations did not produce any visible signs of corrosion of steel at a pH of around 8. Moreover, potassium succinate did not corrode aluminum at all. Potassium acetate and sodium succinate showed practically zero corrosivity on aluminum (weight loss between 0 and a few mg over 3 to 6 weeks in continuously aerated solutions), and their combinations with sodium or potassium lactates resulted in formulations with significantly reduced corrosivity. These and other examples of corrosivity of the de-icers of the present invention are described in detail below.

A. Experimental Procedures

1. Determination of calcium

TAPPI procedure T 247 cm-83 (Classical Method-1983) was used for calcium determination in pulp and paper sludge granules. The procedure is based on EDTA titration of $HNO_3$-soluble calcium in ashed sludge and pulp. EDTA forms a highly colored water-soluble complex with calcium, while other metal ions present are masked with triethanolamine. The ash was placed in 10 mL of Milli-Q and 3 mL of 5 M nitric acid (325 mL of concentrated nitric acid diluted to 1 L with water) was added. The mixture was heated for 5–10 min on a steam bath, transferred into a 300-mL flask, the volume was adjusted to 100 mL, 5 mL of 8 M KOH solution was added, the flask was shaken occasionally for 5 min, and 5 mL of triethanolamine (diluted 10 times), and then 2 mL of hydroxylamine hydrochloride solution (2 g/100 mL) were added, along with 100 mg of calred indicator. The mixture was titrated with 0.02 M EDTA solution to a color change from red-wine to blue. Calcium content (in %) was calculated as EDTA(mL)×0.08016/g of dry weight ash.

2. Moisture determination in pulp and paper sludge granules and other solid materials was performed by heating of a sample at 105° C.—until a constant weight was attained—using the Mettler Infrared Moisture Analyzer, or a programmable oven. Ash content was determined by combustion of the material overnight in a furnace at 525° C., and is given per dry weight.

3. Solids content in solutions of de-icing chemicals was determined by drying of an aliquot (3–5 g) in a programmable oven at 105° C., until a constant weight was attained. For calcium chloride solutions, a correction was made for bound water; it was established, that at our experimental conditions bound water accounted for 14% of the weight of calcium chloride solution dried at 105° C. HPLC determination (Reversed Phase, $C_{18}$ LUNA column, Phenomenex) of concentration of sodium and potassium salts of lactic, succinic, and acetic acids in water solutions gave practically the same figures as those determined by drying at 105° C., within 1% w/w in the range of 25 to 60% w/w concentration.

4. The test for ice melting by liquid de-icing chemicals was carried out in accordance with SHRP H-205.2 (Strategic Highway Research Program, National Research Council, 1992). The test utilizes a sheet of ice of uniform thickness (⅛", or 3.2 mm), derived from 130 mL of deionized water, frozen in a flat circular PLEXIGLAS dish of 9" diameter. After equilibration to the desired temperature (5° F., 15° F., or 25° F., i.e, −15° C., −9.4° C., or −3.9° C., respectively), 4.5–5.0 g (3.8 mL) of liquid de-icer was distributed over the surface of the ice via a syringe. At time intervals 10 min, 20 min, 30 min, 40 min, and 60 min, generated brines were withdrawn via a syringe, measured for volume, and reintroduced back to the specimen.

5. The test for ice melting by solid de-icers was carried out in accordance with SHRP H-205.1. The test employed the same protocol as in SHRP H-205.2 (see above) except 4.170 g of solid de-icer was used.

6. The test for ice penetration of liquid de-icing chemicals was carried out in accordance with SHRP H-205.4 (Strategic Highway Research Program, National Research Council, 1992). The test method provides for determination of the capability of a liquid de-icer to melt through ice and penetrate to a pavement/ice interface, and the time required at various temperatures for the penetration of the de-icer through the ice layers of a relatively small ice surface exposed to the liquid de-icer. The test utilizes an ice-penetration PLEXIGLAS apparatus containing ten 35-mm deep 5/32" cavities filled with frozen deionized water. After equilibration to the desired temperature (5° F., 15° F., or 25° F., i.e., −15° C., −9.4° C., or −3.9° C., respectively), a 0.03 mL test sample (34–42 mg), containing a dye, was discharged onto the surface of the ice with a micropipetting system. Penetration depths were observed and recorded, using graph paper affixed to the test apparatus, at time intervals 5 min, 10 min, 15 min, 20 min, 30 min, 45 min, and 60 min.

7. The test for ice penetration of solid de-icers was carried out in accordance with SHRP H-205.3. The test employed the same protocol as in SHRP H-205.4 (see above) except the dye was transferred to the ice surface 1–2 hr before the solid de-icer specimen was applied, in the range of 22 to 27 mg.

8. The test for freezing point depression was carried out using 50-mL solutions in glass beakers placed in a freezer at −70° C. A digital thermometer probe was immersed in each solution tested outside the freezer, and a chronometer recorded the passage of time. Temperatures were recorded at 15-sec intervals until the temperature reached −52° C. (−62° F.). An inflection on the temperature-time curve, such as a distinct plateau, with a subsequent continuation in temperature decrease, indicated the freezing point, or some other transition of the physical state of the liquid, such as the eutectic temperature of the composition.

9. The test for metal corrosion was carried out in accordance with SHRP H-205.7. In the test, the weighed metal specimens, cold rolled steel C1018 coupons (density 7.86 g/cm$^3$, surface area 29.6875 cm$^2$, weight in the range of 30 to 34 g), or aluminum alloy A7075 coupons (density 2.81 g/cm$^3$, surface area 29.6875 cm$^2$, weight in the range of 10 to 11 g), were immersed, under normal pressure and room temperature, in the solution to be tested, for a time period from 1 week to 6 weeks. Air was constantly bubbled through the test solutions during the testing period. 3% w/w sodium chloride or 3% w/w calcium chloride were used as standard, "master solutions." After 1, 2, 3, and 6 weeks the metal coupons were removed, cleaned from rust or protective oxides (passivation films) both mechanically and by immersing the coupons in an acid bath, rinsed with acetone, dried, and their weight was determined again. The weight loss between the two weight determinations in milligrams per test specimen over a certain time period (hrs) was used to calculate corrosion rate, in mils per year (CR, mpy), using the following equations: for steel CR=14.79×mg/hrs, and for aluminum CR=41.36×mg/hrs.

Liquid de-icing agents described in the following Examples 1 through 34 and conventional de-icers of the Comparative Examples 160 through 184 were prepared by mixing and/or neutralizing the respective organic acids, or just by dissolving the conventional de-icers in water. Preparation of solid pulp and paper sludge-based granular de-icers, both by impregnation of the granules in the liquid de-icing formulations and via chemical transformations, is further described in Examples 35–67 and Examples 68–70, respectively. Tests of the liquid and solid de-icers for their ice-melting and ice-penetration capability (Examples 71–339), freezing point depression (Examples 340–383), and corrosion effects on metals, steel and aluminum (Examples 384–445) are described below.

B. Liquid De-icing Agents and Their Compositions

EXAMPLES 1 THROUGH 5

These Examples describe preparations of ingredients of liquid de-icing compositions later tested for their ice-melting and ice-penetration capabilities, freezing point depression, and corrosive effects on steel and aluminum.

Example 1

Eight liters of 85% DL-lactic acid were neutralized with about six liters of 50% sodium hydroxide until the pH was 8.1. The concentration of the resulting sodium lactate in the solution obtained was 64% w/w, as shown by drying the aliquot overnight at 105° C.

Example 2

The procedure of Example 1 was repeated, but with the difference that about 5 kg of solid potassium hydroxide was used for the neutralization. The concentration of the resulting potassium lactate in solution was 74% w/w, as shown by drying the aliquot overnight at 105° C.

Example 3

Seven liters of glacial acetic acid were neutralized with 7.385 kg of solid potassium hydroxide, six liters of water was added, and the pH was adjusted to 8.0. The oncentration of the resulting potassium acetate in the solution obtained was 60% w/w.

Example 4

Six kg of succinic acid were dissolved in 10 liters of hot water (60–70° C.), and 8 kg of solid potassium hydroxide was added to adjust the pH to 7.5. 19 liters of potassium succinate solution were obtained, with a concentration of 47% w/w.

Example 5

The procedure of Example 4 was repeated, but with the difference that 10.4 kg of 50% sodium hydroxide was used for the neutralization and 22 liters of water were added, since sodium succinate is less soluble compared to its potassium salt. The concentration of the obtained sodium succinate was 22% w/w.

Example 6

2014 g of the 60% potassium acetate solution obtained in Example 3 were mixed with 2019 g of the 48% sodium lactate solution obtained in Example 1 and further diluted with water. The pH was adjusted to 8.0. The resulting mixture of potassium acetate (55%)/sodium lactate (45%) solution had a total concentration of solids equal to 54%, as determined by drying at 105° C. overnight.

EXAMPLES 7 THROUGH 34

The mixing procedure of Example 6 was repeated, but with the difference that various compositions were prepared in different concentrations and from different ingredients, using those described in Examples 1 through 5, as well as from commercially available chemicals. These compositions were tested and their performance is described in Examples 71 through 159, and Examples 245 through 288.

TABLE 1

De-icing compositions tested in Examples 71 through 159. Concentrations are in wt %. The pH of the compositions was adjusted to 8.0 with the corresponding acid or hydroxide of the corresponding metal. The solids content of the solutions was determined by drying of the solutions at 105° C. The weight fraction of the multiple compositions was calculated based on the weight amounts of the ingredients mixed.

| Example | Composition | Weight concentration in water solution |
|---|---|---|
| 7 | Sodium Lactate (95%) - Potassium Acetate (5%) | 50% |
| 8 | Sodium Lactate (90%) - Potassium Acetate (10%) | 50% |
| 9 | Sodium Lactate (80%) - Potassium Acetate (20%) | 51% |
| 10 | Sodium Lactate (50%) - Potassium Acetate (50%) | 51% |
| 11 | Sodium Lactate (20%) - Potassium Acetate (80%) | 52% |
| 12 | Sodium Lactate (10%) - Potassium Acetate (90%) | 52% |
| 13 | Sodium Lactate (34%) - Potassium Lactate (66%) | 52% |
| 14 | Sodium Lactate (98%) - Sodium Succinate (2%) | 54% |
| 15 | Sodium Lactate (97%) - Sodium Succinate (3%) | 50% |
| 16 | Sodium Lactate (95%) - Sodium Succinate (5%) | 52% |
| 17 | Sodium Lactate (93%) - Sodium Succinate (7%) | 51% |
| 18 | Sodium Lactate (85%) - Sodium Succinate (15%) | 51% |
| 19 | Sodium Lactate (85%) - Potassium Succinate (15%) | 50% |
| 20 | Potassium Lactate (95%) - Potassium Acetate (5%) | 55% |
| 21 | Potassium Lactate (90%) - Potassium Acetate (10%) | 54% |
| 22 | Potassium Lactate (96%) - Potassium Succinate (4%) | 54% |
| 23 | Potassium Lactate (92%) - Potassium Succinate (8%) | 54% |
| 24 | Potassium Lactate (88%) - Potassium Succinate (12%) | 53% |
| 25 | Potassium Lactate (50%) - Potassium Succinate (50%) | 50% |
| 26 | Potassium Lactate (90%) - Potassium Formate (10%) | 50% |
| 27 | Potassium Lactate (50%) - Potassium Formate (50%) | 50% |
| 28 | Potassium Lactate (10%) - Potassium Formate (90%) | 50% |
| 29 | Potassium Lactate (95%) - Sodium Chloride (5%) | 50% |
| 30 | Sodium Lactate (94%) - Sodium Acetate (3%) - Sodium Succinate (3%) | 50% |
| 31 | Sodium Lactate (90%) - Sodium Acetate (5%) - Sodium Succinate (5%) | 50% |
| 32 | Sodium Lactate (89%) - Sodium Acetate (3%) - Sodium Succinate (3%) - Sodium Formate (5%) | 50% |
| 33 | Potassium Lactate (90%) - Potassium Acetate (5%) - Potassium Succinate (5%) | 50% |
| 34 | Potassium Lactate (85%) - Potassium Acetate (5%) - Potassium Succinate (5%) - Potassium Formate (5%) | 51% |

C. Solid De-icer Compositions

EXAMPLES 35 THROUGH 49

These examples describe preparation of solid de-icers by impregnation of granulated pulp and paper sludge, BIODAC with liquid de-icing agents (see Examples 1 through 34). The solid de-icers were tested as described in Examples 185 through 244 and Examples 305 through 339.

Example 35

1,400 g of dry BIODAC 16/30 were immersed into 2 L of sodium lactate (45%)-potassium acetate (55%) double salt solution (total concentration 54% w/w), obtained as described in Example 6, incubated for 1 hr, decanted, and dried overnight at 105° C. 2,125 g of dry, dust-free, free-flowing granules were obtained. The load of dry de-icing chemicals was 725 g, or 34% of total weight of the solid loaded granules.

Example 36

The procedure of Example 35 was repeated, but with the difference that 200 g of dry BIODAC 12/20 were immersed into 300 mL of 49% (w/w) potassium acetate solution, obtained as in Example 3 and diluted. The mixture was incubated for 2 hrs. After drying, 346 g of dry, dust-free, free-flowing granules were obtained, containing 42% w/w of the entrapped potassium acetate.

Example 37

The procedure of Example 36 was repeated, but with the difference that 10 g of dry BIODAC 12/20 was immersed into 50 mL of 69% (w/w) potassium acetate solution. The mixture was incubated for 1 hr. After drying, 19.8 g of dry, dust-free, free-flowing granules were obtained, containing 49% w/w of the entrapped de-icing agent.

Example 38

The procedure of Example 36 was repeated, but with the difference that 500 g of dry BIODAC 12/20 were immersed into 900 g of 50% potassium acetate solution (the weight ratio was 1:1.8), pH 7.6. The mixture was incubated for 30 min, excess of the liquid was decanted, and the wet granules were dried overnight at 95° C. 851 g of dry, dust-free, free-flowing granules was obtained, containing 41% w/w of the entrapped potassium acetate.

Example 39

The procedure of Example 36 was repeated, but with the difference that 3,195 g of 50% potassium acetate solution were added to 2,458 g of dry BIODAC 12/20 (the weight ratio was 1:1.3), the mixture was incubated for 30 min at room temperature, and dried at 90° C. for 22 hrs. 3,863 g of dry, dust-free, free-flowing granules were obtained, containing 36% w/w of the entrapped de-icing agent.

Example 40

The procedure of Example 35 was repeated, but with the difference that less-concentrated double-salt solution (total concentration 33% w/w) was used, and 10 g of dry BIODAC 16/30 were immersed into 45 g of said double-salt solution. After drying, 13.9 g of dry, dust-free, free-flowing granules were obtained, containing 28% w/w of the entrapped de-icing agent.

Example 41

The procedure of Example 35 was repeated, but with the difference that 10 g of dry BIODAC 8/30 were immersed into 48 g of the same double salt solution as described in Example 35. After drying, 17.6 g of dry, dust-free, free-flowing granules were obtained, containing 43% w/w of the entrapped de-icing agent.

Example 42

The procedure of Example 35 was repeated, but with the difference that 383 g of dry BIODAC 8/30 were mixed with 1000 g of 50% of the sodium lactate (45%)-potassium acetate (55%) double salt solution, prepared as in Example 6 and diluted. The granules were partly immersed, partly floating on surface of the solution. After drying, 532 g of dry, dust-free, free-flowing granules were obtained, containing 28% w/w of the entrapped de-icing agent.

Example 43

The procedure of Example 37 was repeated, but with the difference that 10 g of dry BIODAC 12/20 were immersed into 50 mL of 50% (w/w) sodium lactate solution, obtained as described in Example 1 and diluted. The mixture was incubated for 1 hr. After drying, 16.7 g of dry, dust-free, free-flowing granules were obtained, containing 40% w/w of the entrapped de-icing agent.

Example 44

The procedure of Example 37 was repeated, but with the difference that 10 g of dry BIODAC 12/20 were immersed into 50 mL of 69% (w/w) potassium acetate/sodium lactate solution (50%-50% relative content w/w). The mixture was incubated for 1 hr. After drying, 18.3 g of dry, dust-free, free-flowing granules were obtained, containing 45% w/w of the entrapped de-icing agent.

Example 45

The procedure of Example 43 was repeated, but with the difference that 10 g of dry BIODAC 16/30 were immersed into 45 g of 54% w/w sodium lactate solution, obtained as described in Example 1 and diluted. The mixture was incubated for 2 hrs. After drying, 15.8 g of dry, dust-free, free-flowing granules were obtained, containing 37% w/w of the entrapped de-icing agent.

Example 46

The procedure of Example 45 was repeated, but with the difference that incubation time was 15 min. After drying, 15.0 g of dry, dust-free, free-flowing granules were obtained, containing 33% w/w of the entrapped de-icing agent.

Example 47

The procedure of Example 35 was repeated, but with the difference that 86 g of dry BIODAC (unscreened) were immersed into 410 g of 50% of the sodium lactate (45%)-potassium acetate (55%) double salt solution, prepared as in Example 6 and diluted as in Example 42. After drying, 161 g of dry, dust-free, free-flowing granules were obtained, containing 46% w/w of the entrapped de-icing agent.

Example 48

The procedure of Example 35 was repeated, but with the difference that 100 g of dry BIODAC 12/20 were immersed into 250 mL of saturated (27% w/w) sodium chloride solution. After drying, 119 g of dry, dust-free, free-flowing granules were obtained, containing 16% w/w of the entrapped de-icing agent.

Example 49

The procedure of Example 48 was repeated, but with the difference that 100 g of dry BIODAC 12/20 were immersed into 250 mL of saturated calcium chloride solution. After drying, 134.5 g of dry, dust-free, free-flowing granules were obtained, containing 26% w/w of the entrapped de-icing agent.

EXAMPLES 50 THROUGH 52

The procedure of Example 43 was repeated, but with the difference that three 50% (w/w) sodium lactate solutions of different purity (high, medium, and low grade), obtained by fermentation, were used to impregnate dry BIODAC 12/20 granules. Fermentation of sucrose, followed by downstream processing, was employed to produce these solutions. High grade 50% sodium lactate solution (Example 50) was clear and colorless. Medium grade 50% sodium lactate solution (Example 51) was of a yellowish color. Crude, low-grade 50% sodium lactate solution (Example 52) was very dark, and was actually a cell-free filtrate of the fermentation broth, containing small amounts of succinic acid, sugars, and other components of the fermentation medium. In each case 25 g of the granules were immersed into 90 g of sodium lactate solution, kept for 30 min, excess liquid was decanted, and the wet granules were dried at 105° C. overnight. The yields of dry, dust-free, free-flowing granules were 43.4 g, 42.5 g, and 42.8 g, respectively, and the loads of entrapped dry sodium lactate were 42.4%, 41.2%, and 41.6%, respectively.

EXAMPLES 53 THROUGH 57

These Examples describe preparation of solid de-icers by impregnation of granulated pulp and paper sludge (BIODAC 12/20) with liquid de-icing compositions with subsequent drying of the loaded granules as described in Example 35, but with the difference that a 50%-50% composition of sodium lactate and potassium acetate was used, and the weight concentration of the composition in water solution varied from 5% w/w to 50% w/w. Hence, these Examples show the effect of concentration of the impregnated de-icing agent on the loading levels (into granules) ultimately achieved. The solid de-icers obtained were tested as described in Examples 220 through 229.

In each experiment, 10 g of BIODAC 12/20 were immersed into 50 g of a water solution of the 50%-50% composition of sodium lactate/potassium acetate, with a weight concentration of the composition indicated in the following Table. After an hour-long incubation, the residual liquid was decanted, and the samples were dried at 105° C. overnight.

TABLE 2

Effect of concentration of the impregnating de-icing agent on granule loading levels

| Example | 50%-50% Sodium Lactate/Potassium Acetate De-icing Composition Concentration in Water, % (w/w) | Load of De-icers in Granules, % (w/w) |
|---|---|---|
| 53 | 5% | 0.04% |
| 54 | 10% | 5% |
| 55 | 20% | 18% |
| 56 | 33% | 23% |
| 57 | 50% | 35% |

EXAMPLES 58 THROUGH 63

The procedure of preparation of solid de-icers by impregnation of granulated pulp and paper sludge (BIODAC 12/20) with liquid de-icing compositions with subsequent drying of the loaded granules as described in Examples 53 through 57 was repeated, but with the difference that 50% w/w composition of sodium lactate/potassium acetate impregnating mixtures was used in all cases, with the two principal ingredients varying each from 100% to 0% in the mixture, as shown in Table 3. These Examples show the effect of composition of the impregnating de-icing agent on loading levels and on the hygroscopicity (i.e., ability to attract moisture) of the granules. Hygroscopicity was studied in two ways: (1) by exposing dry granular de-icer-loaded samples (after heating them at 105° C. overnight) to a conventional laboratory environment for 10 hrs, and (2) by placing dry granular de-icer-loaded samples (after heating them at 105° C. overnight) into an environmental humidified chamber, equilibrated at 30° C., for 24 hrs. In both the cases sample weights were measured before and after exposing the samples. The solid de-icers were dried again at 105° C. and tested as described in Examples 230 through 237.

TABLE 3

Effect of composition of the impregnating de-icing agent on amount of the de-icer loaded into granules and on hygroscopicity of the granules.

| | | | Weight gain (w/w) | |
|---|---|---|---|---|
| Example | Sodium Lactate/Potassium Acetate De-iceing Compositions (weight fractions %), 50% w/w concentration in water | Load of De-icers in Granules (w/w) | In normal lab conditions for 10 hrs at 22° C. | In the humid chamber for 24 hrs at 30° C. |
| 58 | 0–100 (Potassium Acetate only) | 36% | 4.1% | 31.9% |
| 59 | Sodium Lactate(20) - Potassium Acetate (80) | 33% | 2.6% | 23.1% |
| 60 | Sodium Lactate (40) - Potassium Acetate (60) | 38% | 2.3% | 22.9% |
| 57 | Sodium Lactate (50) - Potassium Acetate (50) | 35% | 2.1% | 19.6% |
| 61 | Sodium Lactate (60) - Potassium Acetate (40) | 36% | 1.9% | 22.4% |
| 62 | Sodium Lactate (80) - Potassium Acetate (20) | 41% | 1.5% | 19.2% |
| 63 | 100–0 (Sodium Lactate only) | 39% | 0.91% | 19.4% |
| | | Average: 37 ± 3% | | |

EXAMPLES 64 AND 65

The procedure of Example 36 was repeated, but with the difference that the incubation times of 10 g of dry BIODAC 12/20 in 50% w/w potassium acetate solution were 30 min and 15 min, respectively. After drying, 16.6 g and 17.5 g of dry, dust-free, free-flowing granules were obtained, containing 40% w/w and 43% w/w of the entrapped de-icing agent, respectively.

EXAMPLES 66 AND 67

These examples describe preparation of solid de-icers by impregnation of granulated low-ash pulp and paper sludge with liquid de-icing agents, as described in Example 35. The solid de-icers were tested as described in Examples 238 through 241.

Example 66

10 g of dry granules (ash content 12.5%) were immersed into 50 mL of sodium lactate (50%)-potassium acetate (50%) double-salt solution (total concentration 68% w/w, pH 8.4), incubated for 1 hr, decanted, and dried overnight at 105° C. 22 g of dry, dust-free, free-flowing granules were obtained. The load of dry de-icing chemicals was 12 g, or 54% of the total weight of the solid loaded granules.

Example 67

The procedure of Example 66 was repeated, but with the difference that pH of the double-salt solution was 13.9. 21 g of dry loaded granules were obtained, containing 52% w/w of the entrapped de-icing agent.

EXAMPLES 68 THROUGH 70

These examples describe preparation of solid de-icers by chemical conversion of the calcium carbonate in BIODAC granules into calcium chloride, calcium nitrate, or calcium acetate by treating the granular BIODAC with hydrochloric, nitric, or acetic acid, respectively. The granular solid de-icers obtained were tested as described in Examples 242 through 244.

Example 68

50 g of dry BIODAC 16/30 (moisture content 3.3% w/w), containing 24±1% calcium carbonate by dry weight was mixed with 60 mL of 10% (w/w) hydrochloric acid (in a molar ratio of 0.7 to the calcium carbonate content in the sludge). Intensive evolution of carbon dioxide was observed. The mixture was incubated for an hour, and dried overnight at 105° C. 49.96 g of dry, dust-free, free-flowing granules were obtained.

Example 69

The procedure of Example 68 was repeated, but with the difference that 68 g of 20% (w/w) nitric acid were mixed with 50 g of dry BIODAC 16/30 (in a molar ratio of 0.9 to the calcium carbonate content in the sludge). Intensive evolution of carbon dioxide was observed. The mixture was incubated for an hour at room temperature, and left overnight at 55° C. 58.08 g of dry dark granules was obtained.

Example 70

The procedure of Example 68 was repeated, but with the difference that 66 g of 20% (w/w) acetic acid was mixed with 50 g of dry BIODAC 16/30 (in a molar ratio of 0.9 to the calcium carbonate content in the sludge). Intensive evolution of carbon dioxide was observed. The mixture was incubated for an hour at room temperature, and left overnight at 55° C. 55.60 g of dry granules were obtained, containing white inclusions of dry calcium acetate.

The following Examples describe test results for the liquid and solid de-icers obtained in Examples 1 through 34 and 35 through 70, respectively, as well as of conventional de-icers and/or those described in the prior art, which appear in Comparative Examples 160 through 184.

D. Ice-melting Capability—Liquid De-icers

EXAMPLES 71 THROUGH 100

These Examples describe test results for sodium lactate, potassium acetate, and their combinations, obtained in Examples 1 and 3, 7 through 12, and 30 through 34.

Examples 71–73

The sodium lactate solution obtained in Example 1 was diluted with deionized water to concentration of 55% w/w. Ice-melting capability was determined as described in the EXPERIMENTAL PROCEDURES, section 4.

TABLE 4

Dynamics of ice melting by 55% w/w water solution of sodium lactate at −3.9° C., −9.4° C., and −15° C.

| Example | Time, min | Ice Temperature ° C. | Brine Volume, mL/g De-icer |
|---|---|---|---|
| 71 | 10 | −3.9 | 2.49 |
|  | 20 | −3.9 | 3.13 |
|  | 30 | −3.9 | 3.41 |
|  | 40 | −3.9 | 3.77 |
|  | 60 | −3.9 | 3.85 |
| 72 | 10 | −9.4 | 1.65 |
|  | 20 | −9.4 | 1.79 |

TABLE 4-continued

Dynamics of ice melting by 55% w/w water solution of sodium lactate at −3.9° C., −9.4° C., and −15° C.

| Example | Time, min | Ice Temperature ° C. | Brine Volume, mL/g De-icer |
|---|---|---|---|
|  | 30 | −9.4 | 1.88 |
|  | 40 | −9.4 | 1.94 |
|  | 60 | −9.4 | 1.96 |
| 73 | 10 | −15 | 1.18 |
|  | 20 | −15 | 1.22 |
|  | 30 | −15 | 1.22 |
|  | 40 | −15 | 1.26 |
|  | 60 | −15 | 1.26 |

Example 74

The procedure of Example 72 was repeated, but with the difference that sodium lactate was tested at a concentration of 40% w/w.

TABLE 5

Dynamics of ice melting by 40% w/w water solution of sodium lactate at −9.4° C.

| Time, min | Ice Temperature, ° C. | Brine Volume, mL/g De-icer |
|---|---|---|
| 10 | −9.4 | 1.10 |
| 20 | −9.4 | 1.28 |
| 30 | −9.4 | 1.28 |
| 40 | −9.4 | 1.32 |
| 60 | −9.4 | 1.32 |

Examples 75–100

The procedure of Examples 71 through 73 was repeated, but with the difference that sodium lactate/potassium acetate compositions obtained in Examples 3 (and diluted) and 7 through 12 were tested. For brevity, de-icing capability is reported in Table 6 only for 60 min data points. In the table, NaLa and KAc stand for sodium lactate and potassium acetate, respectively.

TABLE 6

Ice-melting capability of sodium lactate-potassium acetate compositions (from 0 to 100% w/w of each ingredient) at −3.9° C., −9.4° C., and −15° C. at 60 min exposure

| Example | NaLa/KAc Composition, Weight Fraction of Solids, % | Concentration | Ice Temperature ° C. | Brine Volume, mL/g De-icer |
|---|---|---|---|---|
| 75 | 100–0 (Sodium Lactate) | 50% | −3.9 | 3.64 |
| 76 | 95–5 | 50% | −3.9 | 3.16 |
| 77 | 90–10 | 50% | −3.9 | 3.45 |
| 78 | 80–20 | 51% | −3.9 | 3.83 |
| 79 | 50–50 | 51% | −3.9 | 3.95 |
| 80 | 20–80 | 52% | −3.9 | 4.17 |
| 81 | 10–90 | 52% | −3.9 | 4.33 |
| 82 | 0–100 (Potassium Acetate) | 52% | −3.9 | 4.13 |
| 83 |  | 50% | −3.9 | 4.12 |
| 84 |  | 49% | −3.9 | 3.87 |
| 85 | 100–0 (Sodium Lactate) | 50% | −9.4 | 1.77 |
| 86 | 95–5 | 50% | −9.4 | 1.78 |

TABLE 6-continued

Ice-melting capability of sodium lactate-potassium acetate compositions (from 0 to 100% w/w of each ingredient) at −3.9° C., −9.4° C., and −15° C. at 60 min exposure

| Example | NaLa/KAc Composition, Weight Fraction of Solids, % | Concentration | Ice Temperature ° C. | Brine Volume, mL/g De-icer |
|---|---|---|---|---|
| 87 | 90–10 | 50% | −9.4 | 1.79 |
| 88 | 80–20 | 51% | −9.4 | 1.85 |
| 89 | 50–50 | 51% | −9.4 | 2.15 |
| 90 | 20–80 | 52% | −9.4 | 2.16 |
| 91 | 10–90 | 52% | −9.4 | 2.21 |
| 92 | 0–100 (Potassium Acetate) | 52% | −9.4 | 2.17 |
| 93 | 100–0 (Sodium Lactate) | 50% | −15 | 1.03 |
| 94 | 95–5 | 50% | −15 | 1.14 |
| 95 | 90–10 | 50% | −15 | 1.15 |
| 96 | 80–20 | 51% | −15 | 1.26 |
| 97 | 50–50 | 51% | −15 | 1.36 |
| 98 | 20–80 | 52% | −15 | 1.56 |
| 99 | 10–90 | 52% | −15 | 1.69 |
| 100 | 0–100 (Potassium Acetate) | 52% | −15 | 1.72 |

EXAMPLES 101–109

The procedure of Examples 71 through 73 was repeated, but with the difference that the triple and quadruple salt compositions, obtained in Examples 30 through 34, were tested. For brevity, de-icing capability in the Table is reported only for 60 min data points.

TABLE 7

Ice-melting capability of sodium lactate-based triple and quadruple compositions at −3.9° C., −9.4° C., and −15° C. at 60 min exposure

| Example | Triple and Quadruple Salt Compositions (Weight Fraction of Solids, %) | Concentration | Ice Temperature ° C. | Brine Volume, mL/g De-icer |
|---|---|---|---|---|
| 101 | Sodium Lactate (94%) - Sodium Acetate (3%) - Sodium Succinate (3%) | 50% | −3.9 | 3.02 |
| 102 | Sodium Lactate (89%) - Sodium Acetate (3%) - Sodium Succinate (3%) - Sodium Formate (5%) | 50% | −3.9 | 2.85 |
| 103 | Potassium Lactate (85%) - Potassium Acetate (5%) - Potassium Succinate (5%) - Potassium Formate (5%) | 51% | −3.9 | 3.17 |
| 104 | Sodium Lactate (94%) - Sodium Acetate (3%) - Sodium Succinate (3%) | 50% | −9.4 | 1.83 |
| 105 | Sodium Lactate (89%) - Sodium Acetate (3%) - Sodium Succinate (3%) - Sodium Formate (5%) | 50% | −9.4 | 1.77 |
| 106 | Potassium Lactate (85%) - Potassium Acetate (5%) - Potassium Succinate (5%) - Potassium Formate (5%) | 51% | −9.4 | 1.58 |
| 107 | Sodium Lactate (94%)- Sodium Acetate (3%) - Sodium Succinate (3%) | 50% | −15 | 1.10 |
| 108 | Sodium Lactate (89%)- Sodium Acetate (3%) - Sodium Succinate (3%) - Sodium Formate (5%) | 50% | −15 | 0.98 |
| 109 | Potassium Lactate (85%)- Potassium Acetate (5%) - Potassium Succinate (5%) Potassium Formate (5%) | 51% | −15 | 1.07 |

EXAMPLES 110 THROUGH 159

The procedure of Examples 71 through 73 was repeated, but with the difference that additional double-salt compositions and their constituent salts, obtained in Examples 1 through 5, and 13 through 29, and diluted as indicated in Table 8, were tested. For brevity, de-icing capability is reported in the Table only for 60 min data points.

TABLE 8

Ice-melting capability of organic acid-based compositions and their ingredients (sodium and potassium salts of lactic, succinic, acetic, and formic acids) at −3.9° C., −9.4° C., and −15° C. at 60 min exposure

| Example | Double Salt Compositions (Weight Fraction of Solids, %) | Concentration | Ice Temperature ° C. | Brine Volume, mL/g De-icer |
|---|---|---|---|---|
| 110 | Sodium Lactate (100%) | 40% | −3.9 | 3.24 |
| 75 | | 50% | −3.9 | 3.64 |
| 71 | | 55% | −3.9 | 3.85 |
| 111 | Sodium Lactate (98%)- Sodium Succinate (2%) | 54% | −3.9 | 3.81 |
| 112 | Sodium Lactate (93%)- Sodium Succinate (7%) | 50% | −3.9 | 3.58 |
| 113 | Sodium Succinate (100%) | 30% | −3.9 | 1.37 |
| 114 | Potassium Lactate (100%) | 55% | −3.9 | 3.26 |
| 115 | | 52% | −3.9 | 3.12 |
| 116 | | 50% | −3.9 | 3.03 |
| 117 | Potassium Lactate (96%)- Potassium Succinate (4%) | 54% | −3.9 | 2.91 |
| 118 | Potassium Lactate (92%)- Potassium Succinate (8%) | 54% | −3.9 | 2.94 |
| 119 | Potassium Lactate (88%)- Potassium Succinate (12%) | 53% | −3.9 | 2.95 |
| 120 | Potassium Succinate (100%) | 42% | −3.9 | 2.49 |
| 121 | | 50% | −3.9 | 2.84 |
| 122 | Potassium Lactate (95%) - Potassium Acetate (5%) | 55% | −3.9 | 3.63 |
| 123 | Potassium Lactate (90%) - Potassium Acetate (10%) | 54% | −3.9 | 3.87 |
| 82 | Potassium Acetate (100%) | 52% | −3.9 | 4.13 |
| 83 | | 50% | −3.9 | 4.12 |
| 84 | | 49% | −3.9 | 3.87 |
| 124 | | 40% | −3.9 | 3.66 |
| 72 | Sodium Lactate (100%) | 55% | −9.4 | 1.96 |
| 85 | | 50% | −9.4 | 1.77 |
| 74 | | 40% | −9.4 | 1.32 |
| 125 | Sodium Lactate (34%)- Potassium Lactate (66%) | 52% | −9.4 | 1.63 |
| 126 | Potassium Lactate (100%) | 54% | −9.4 | 1.97 |
| 127 | | 52% | −9.4 | 1.75 |
| 128 | | 50% | −9.4 | 1.66 |
| 129 | Potassium Lactate (92%)- Potassium Succinate (8%) | 53% | −9.4 | 1.60 |

TABLE 8-continued

Ice-melting capability of organic acid-based compositions and their ingredients (sodium and potassium salts of lactic, succinic, acetic, and formic acids) at −3.9° C., −9.4° C., and −15° C. at 60 min exposure

| Example | Double Salt Compositions (Weight Fraction of Solids, %) | Concentration | Ice Temperature ° C. | Brine Volume, mL/g De-icer |
|---|---|---|---|---|
| 130 | Potassium Lactate (50%)-Potassium Succinate (50%) | 50% | −9.4 | 1.62 |
| 131 | Potassium Succinate (100%) | 42% | −9.4 | 1.36 |
| 132 |  | 50% | −9.4 | 1.55 |
| 133 | Sodium Succinate (100%) | 24% | −9.4 | Frozen |
| 134 | Sodium Lactate (97%)-Sodium Succinate (3%) | 50% | −9.4 | 1.74 |
| 135 | Sodium Lactate (93%)-Sodium Succinate (7%) | 51% | −9.4 | 1.67 |
| 136 | Sodium Lactate (85%)-Sodium Succinate (15%) | 51% | −9.4 | 1.49 |
| 137 | Potassium Lactate (95%) - Potassium Acetate (5%) | 50% | −9.4 | 1.70 |
| 138 | Potassium Lactate (90%) - Potassium Acetate (10%) | 50% | −9.4 | 1.67 |
| 92 | Potassium Acetate (100%) | 52% | −9.4 | 2.17 |
| 139 |  | 50% | −9.4 | 2.12 |
| 140 |  | 39% | −9.4 | 1.60 |
| 141 | Potassium Lactate (90%) - Potassium Formate (10%) | 50% | −9.4 | 1.51 |
| 142 | Potassium Lactate (50%) - Potassium Formate (50%) | 50% | −9.4 | 2.10 |
| 143 | Potassium Lactate (10%) - Potassium Formate (90%) | 50% | −9.4 | 2.24 |
| 144 | Potassium Lactate (95%) - Sodium Chloride (5%) | 50% | −9.4 | 1.93 |
| 73 | Sodium Lactate (100%) | 55% | −15 | 1.26 |
| 93 |  | 50% | −15 | 1.03 |
| 145 | Sodium Lactate (98%) - Sodium Succinate (2%) | 54% | 15 | 1.22 |
| 146 | Sodium Lactate (95%) - Sodium Succinate (5%) | 52% | −15 | 1.04 |
| 147 | Sodium Succinate (100%) | 24% | −15 | Frozen |
| 148 | Sodium Lactate (85%) - Potassium Succinate (15%) | 50% | −15 | 1.01 |
| 149 | Potassium Lactate (100%) | 55% | −15 | 1.15 |
| 150 |  | 52% | −15 | 1.12 |
| 151 |  | 50% | −15 | 1.03 |
| 152 | Potassium Succinate (100%) | 50% | −15 | 1.18 |
| 153 |  | 47% | −15 | 1.08 |
| 154 | Potassium Lactate (92%) - Potassium Succinate (8%) | 54% | −15 | 1.25 |
| 155 | Potassium Lactate (88%) - Potassium Succinate (12%) | 53% | −15 | 1.24 |
| 156 | Potassium Lactate (95%) - Potassium Acetate (5%) | 55% | −15 | 1.25 |
| 157 | Potassium Lactate (90%) - Potassium Acetate (10%) | 54% | −15 | 1.44 |
| 100 | Potassium Acetate (100%) | 52% | −15 | 1.72 |
| 158 |  | 50% | −15 | 1.57 |
| 159 |  | 40% | −15 | 1.16 |

COMPARATIVE EXAMPLES 160 THROUGH 184

These Examples describe test results for conventional liquid de-icers and other de-icers that are not widely used. The data are given for comparative purposes. The ice-melting capabilities of the chemicals listed in the following Table were determined as described in the EXPERIMENTAL PROCEDURES, section 4. For brevity, de-icing capability is reported only for 60 min data points.

TABLE 9

Ice-melting capability of conventional liquid de-icers and/or de-icers not commonly in practical use but generally known, at −3.9° C., −9.4° C., and −15° C. at 60 min exposure

| Example | De-icing Chemicals | Concentration | Ice Temperature, ° C. | Brine Volume, mL/g De-icer |
|---|---|---|---|---|
| 160 | Ethylene glycol | 100% | −3.9 | 6.12 |
| 82 | Potassium Acetate | 52% | −3.9 | 4.13 |
| 83 |  | 50% | −3.9 | 4.12 |
| 84 |  | 49% | −3.9 | 3.87 |
| 124 |  | 40% | −3.9 | 3.66 |
| 161 | Sodium Acetate | 50% | −3.9 | 3.80 |
| 162 |  | 34% | −3.9 | 3.11 |
| 163 | Potassium Formate | 65% | −3.9 | 3.57 |
| 164 |  | 50% | −3.9 | 3.01 |
| 165 | Calcium Chloride | 37.3% | −3.9 | 3.22 |
| 166 | Sodium Chloride | 26% | −3.9 | 2.80 |
| 167 | Calcium-Magnesium Acetate (13% Ca Acetate + 17% Mg Acetate) | 30% | −3.9 | 1.71 |
| 168 | Calcium-Magnesium Acetate (17% Ca Acetate + 11% Mg Acetate) | 28% | −3.9 | 1.25 |
| 169 | Sodium Formate | 50% | −3.9 | Frozen |
| 170 | Ethylene glycol | 100% | −9.4 | 4.01 |
| 171 | Propylene glycol | 100% | −9.4 | 3.03 |
| 172 |  | 55% | −9.4 | 2.08 |
| 173 | Calcium Chloride | 37% | −9.4 | 2.41 |
| 174 | Potassium Formate | 50% | −9.4 | 2.20 |
| 92 | Potassium Acetate | 52% | −9.4 | 2.17 |
| 139 |  | 50% | −9.4 | 2.12 |
| 140 |  | 39% | −9.4 | 1.60 |
| 175 | Sodium Chloride | 26% | −9.4 | 1.61 |
| 176 | Calcium-Magnesium Acetate (13% Ca Acetate + 17% Mg Acetate) | 30% | −9.4 | 0.88 |
| 177 | Calcium-Magnesium Acetate (17% Ca Acetate + 11% Mg Acetate) | 28% | −9.4 | 0.93 |
| 178 | Sodium Acetate | 34% | −9.4 | 0.71 |
| 179 | Calcium Chloride | 37.3% | −15 | 1.72 |
| 100 | Potassium Acetate | 52% | −15 | 1.72 |
| 158 |  | 50% | −15 | 1.57 |
| 159 |  | 40% | −15 | 1.16 |
| 180 | Potassium Formate | 65% | −15 | 2.15 |
| 181 |  | 53% | −15 | 1.66 |
| 182 |  | 50% | −15 | 1.52 |
| 183 | Sodium Chloride | 26% | −15 | 1.01 |
| 184 | Sodium Acetate | 50% | −15 | Frozen |

E. Ice-melting Capability—Solid De-icers

EXAMPLES 185 AND 186

A solid de-icer composition comprising BIODAC 16/30 loaded with a sodium lactate (45%)/potassium acetate (55%) composition as described in Example 35 was tested for ice-melting capability as described in the EXPERIMENTAL PROCEDURES, Section 5.

TABLE 10

Dynamics of ice melting by BIODAC-based solid de-icer loaded with sodium lactate (45%)-potassium acetate (55%) composition (obtained in Example 35) at −3.9° C. and −9.4° C. 4.17 g of solid de-icer was used in each case.

| Example | Time, min | Ice Temperature, ° C. | Brine Volume, mL |
|---|---|---|---|
| 185 | 10 | −3.9 | 0 |
|  | 20 | −3.9 | 1.8 |
|  | 30 | −3.9 | 3.1 |
|  | 40 | −3.9 | 4.4 |
|  | 60 | −3.9 | 5.5 |
| 186 | 20 | −9.4 | 0.2 |
|  | 40 | −9.4 | 1.0 |
|  | 60 | −9.4 | 1.6 |

EXAMPLES 187 THROUGH 219

The test procedure of Examples 185 and 186 was repeated for the solid granular BIODAC-based de-icers, obtained in Examples 35–65. For brevity, de-icing capability in Table 11 is reported only for 60 min data points. In the Table, NaLa and KAc stand for sodium lactate and potassium acetate.

TABLE 11

Ice-melting capability of BIODAC granules loaded with organic and inorganic de-icers, at −3.9° C. and −9.4° C. at 60 min exposure. 4.17 g of the solid de-icer was tested in each case as described in Experimental Procedures, Section 5.

| Example | Loaded Composition [obtained as described in] | Load of De-icing Chemicals in Granules, w/w | Ice Temperature ° C. | Brine Volume, mL |
|---|---|---|---|---|
| 187 | NaLa (45%)-KAc (55%) [Example 47] | 46% | −3.9 | 6.5–8.1 |
| 188 | NaLa (50%)-KAc (50%) [Example 44] | 45% | −3.9 | 6.0–6.4 |
| 185 | NaLa (45%)-KAc (55%) [Example 35] | 34% | −3.9 | 5.5 |
| 189 | NaLa (45%)-KAc (55%) [Example 42] | 28% | −3.9 | 4.1 |
| 190 | Potassium Acetate (100%) [Example 37] | 49% | −3.9 | 10.0–11.2 |
| 191 | Potassium Acetate (100%) [Example 65] | 43% | −3.9 | 10.0–11.0 |
| 192 | Potassium Acetate (100%) [Example 36] | 42% | −3.9 | 9.0–10.0 |
| 193 | Potassium Acetate (100%) [Example 38] | 41% | −3.9 | 8.5–9.5 |
| 194 | Potassium Acetate (100%) [Example 64] | 40% | −3.9 | 8.0–9.0 |
| 195 | Potassium Acetate (100%) [Example 39] | 36% | −3.9 | 6.5–7.2 |
| 196 | Sodium Lactate (100%) [Example 50] | 42% | −3.9 | 6.0–6.6 |
| 197 | Sodium Lactate (100%) [Example 52] | 42% | −3.9 | 5.6 |
| 198 | Sodium Lactate (100%) [Example 51] | 41% | −3.9 | 5.4–6.1 |
| 199 | Sodium Lactate (100%) [Example 43] | 40% | −3.9 | 5.0–5.5 |
| 200 | Sodium Lactate (100%) [Example 63] | 39% | −3.9 | 5.2–5.5 |
| 201 | Sodium Lactate (100%) [Example 46] | 33% | −3.9 | 4.5 |
| 202 | Sodium Chloride (100%) [Example 48] | 16% | −3.9 | 3.8 |
| 203 | Calcium Chloride (100%) [Example 49] | 26% | −3.9 | 4.8 |
| 204 | NaLa (45%)-Kac (55%) [Example 47] | 46% | −9.4 | 1.8–2.0 |
| 186 | NaLa (45%)-Kac (55%) [Example 35] | 34% | −9.4 | 1.6 |
| 205 | NaLa (45%)-Kac (55%) [Example 42] | 28% | −9.4 | 0.4 |
| 206 | Potassium Acetate (100%) [Example 37] | 49% | −9.4 | 3.4 |
| 207 | Potassium Acetate (100%) [Example 65] | 43% | −9.4 | 3.2 |
| 208 | Potassium Acetate (100%) [Example 36] | 42% | −9.4 | 3.0 |
| 209 | Potassium Acetate (100%) [Example 38] | 41% | −9.4 | 2.6 |
| 210 | Potassium Acetate (100%) [Example 64] | 40% | −9.4 | 2.2–3.0 |
| 211 | Potassium Acetate (100%) [Example 39] | 36% | −9.4 | 2.4 |
| 212 | Sodium Lactate (100%) [Example 50] | 42% | −9.4 | 0.2 |
| 213 | Sodium Lactate (100%) [Example 52] | 42% | −9.4 | 0.1–0.2 |
| 214 | Sodium Lactate (100%) [Example 51] | 41% | −9.4 | 0.2 |
| 215 | Sodium Lactate (100%) [Example 43] | 40% | −9.4 | 0.2 |
| 216 | Sodium Lactate (100%) [Example 63] | 39% | −9.4 | 0.2 |
| 217 | Sodium Lactate (100%) [Example 46] | 33% | −9.4 | 0–0.1 |
| 218 | Sodium Chloride (100%) [Example 48] | 16% | −9.4 | 0 |
| 219 | Calcium Chloride (100%) [Example 49] | 26% | −9.4 | 1.0 |

EXAMPLES 220 THROUGH 229

The test procedure of Examples 185 and 186 was repeated for the solid granular BIODAC-based de-icers, obtained in Examples 53 through 57. For brevity, de-icing capability in Table 12 is reported only for 60 min data points. In the Table, NaLa and KAc stand for sodium lactate and potassium acetate.

TABLE 12

Ice-melting capability of BIODAC granules loaded with sodium lactate-potassium acetate compositions, at −3.9° C. and −9.4° C. at 60 min exposure. 4.17 g of the solid de-icer was tested in each case as described in Experimental Procedures, Section 5.

| Example | Loaded Composition [obtained as described in] | Load of De-icing Chemicals in Granules, w/w | Ice Temperature ° C. | Brine Volume, mL |
|---|---|---|---|---|
| 220 | NaLa (50%)-KAc (50%) [Example 5 3] | 0.04% | −3.9 | 0 |
| 221 | NaLa (50%)-KAc (50%) [Example 54] | 5% | −3.9 | 0 |
| 222 | NaLa (50%)-KAc (50%) [Example 55] | 18% | −3.9 | 0.9 |
| 223 | NaLa (50%)-KAc (50%) [Example 56] | 23% | −3.9 | 3.0–3.4 |
| 224 | NaLa (50%)-KAc (50%) [Example 57] | 35% | −3.9 | 5.8 |
| 225 | NaLa (50%)-KAc (50%) [Example 53] | 0.04% | −9.4 | 0 |
| 226 | NaLa (50%)-KAc (50%) [Example 54] | 5% | −9.4 | 0 |
| 227 | NaLa (50%)-KAc (50%) [Example 55] | 18% | −9.4 | 0 |
| 228 | NaLa (50%)-KAc (50%) [Example 56] | 23% | −9.4 | 0.2 |
| 229 | NaLa (50%)-KAc (50%) [Example 57] | 35% | −9.4 | 1.5 |

EXAMPLES 230 THROUGH 237

The test procedure of Examples 185 and 186 was repeated for the solid granular BIODAC-based de-icers obtained in Examples 58 through 65. De-icers, similar in composition, are also listed in Table 13 for comparison. For brevity, de-icing capability in Table 13 is reported only for 60 min data points. In the Table, NaLa and KAc stand for sodium lactate and potassium acetate.

TABLE 13

The ice-melting capability of BIODAC granules loaded with sodium lactate-potassium acetate compositions, at −3.9° C. and −9.4° C. at 60 min exposure. 4.17 g of the solid de-icer was tested in each case as described in Experimental Procedures, Section 5.

| Example | Loaded Composition [obtained as described in] | Load of De-icing Chemicals in Granules, w/w | Ice Temperature ° C. | Brine Volume, mL |
|---|---|---|---|---|
| 190 | Potassium Acetate (100%) [Example 37] | 49% | −3.9 | 10.0–11.2 |
| 191 | Potassium Acetate (100%) [Example 65] | 43% | −3.9 | 10.0–11.0 |
| 192 | Potassium Acetate (100%) [Example 36] | 42% | −3.9 | 9.0–10.0 |
| 193 | Potassium Acetate (100%) [Example 38] | 41% | −3.9 | 8.5–9.5 |
| 194 | Potassium Acetate (100%) [Example 64] | 40% | −3.9 | 8.0–9.0 |
| 195 | Potassium Acetate (100%) [Example 39] | 36% | −3.9 | 6.5–7.2 |
| 230 | NaLa (20%)-KAc (80%) [Example 59] | 33% | −3.9 | 7.2 |
| 231 | NaLa (40%)-KAc (60%) [Example 60] | 38% | −3.9 | 5.8 |
| 224 | NaLa (50%)-KAc (50%) [Example 57] | 35% | −3.9 | 5.8 |
| 232 | NaLa (60%)-KAc (40%) [Example 61] | 36% | −3.9 | 5.7 |
| 233 | NaLa(80%)-KAc (20%) [Example 62] | 41% | −3.9 | 4.5 |
| 196 | Sodium Lactate (100%) [Example 50] | 42% | −3.9 | 6.0–6.6 |
| 197 | Sodium Lactate (100%) [Example 52] | 42% | −3.9 | 5.6 |
| 198 | Sodium Lactate (100%) [Example 51] | 41% | −3.9 | 6.1 |
| 199 | Sodium Lactate (100%) [Example 43] | 40% | −3.9 | 5.0–5.5 |
| 200 | Sodium Lactate (100%) [Example 63] | 39% | −3.9 | 5.2–5.5 |
| 201 | Sodium Lactate (100%) [Example 46] | 33% | −3.9 | 4.5 |
| 206 | Potassium Acetate (100%) [Example 37] | 49% | −9.4 | 3.4 |
| 207 | Potassium Acetate (100%) [Example 65] | 43% | −9.4 | 3.2 |
| 208 | Potassium Acetate (100%) [Example 36] | 42% | −9.4 | 3.0 |
| 209 | Potassium Acetate (100%) [Example 38] | 41% | −9.4 | 2.6 |
| 210 | Potassium Acetate (100%) [Example 64] | 40% | −9.4 | 2.2–3.0 |
| 211 | Potassium Acetate (100%) [Example 39] | 36% | −9.4 | 2.4 |
| 234 | NaLa (20%)-KAc (80%) [Example 59] | 33% | −9.4 | 1.9 |
| 235 | NaLa (40%)-KAc (60%) [Example 60] | 38% | −9.4 | 1.6 |
| 229 | NaLa (50%)-KAc (50%) [Example 57] | 35% | −9.4 | 1.5 |
| 236 | NaLa (60%)-KAc (40%) [Example 61] | 36% | −9.4 | 1.4 |
| 237 | NaLa (80%)-KAc (20%) [Example 62] | 41% | −9.4 | 0.6 |
| 212 | Sodium Lactate (100%) [Example 50] | 42% | −9.4 | 0.2 |
| 213 | Sodium Lactate (100%) [Example 52] | 42% | −9.4 | 0.2 |
| 214 | Sodium Lactate (100%) [Example 51] | 41% | −9.4 | 0.2 |
| 215 | Sodium Lactate (100%) [Example 43] | 40% | −9.4 | 0.2 |
| 216 | Sodium Lactate (100%) [Example 63] | 39% | −9.4 | 0.2 |
| 217 | Sodium Lactate (100%) [Example 46] | 33% | −9.4 | 0–0.1 |

EXAMPLES 238 THROUGH 241

The test procedure of Examples 185 and 186 was repeated for the solid granular low-ash BIODAC-based de-icers obtained in Examples 66 and 67.

TABLE 14

Ice-melting capability of BIODAC low-ash granules loaded with sodium lactate (50%)-potassium acetate (50%) composition, obtained in Examples 66 and 67, at −3.9° C. and −9.4° C. at 60 min exposure. 4.17 g of the solid de-icer was tested in each case as described in Experimental Procedures, Section 5.

| Example | Load of De-icing Chemicals in Granules, w/w [obtained as described in] | Ice Temperature ° C. | Brine Volume, mL |
|---|---|---|---|
| 238 | 54% [Example 66] | −3.9 | 6.4 |
| 239 | 52% [Example 67] | −3.9 | 7.2 |
| 240 | 54% [Example 66] | −9.4 | 1.6 |
| 241 | 52% [Example 67] | −9.4 | 1.2 |

EXAMPLES 242 THROUGH 244

These Examples describe test results for BIODAC-based solid de-icers obtained by chemical conversion of the calcium carbonate content in BIODAC granules as described in Examples 68 through 70. The granular solid de-icers were tested for ice-melting capability as described in the EXPERIMENTAL PROCEDURES, Section 5. For brevity, de-icing capability in the following Table is reported only for 60 min data points.

TABLE 15

The ice-melting capability of BIODAC granules loaded with solid inorganic de-icers obtained by chemical conversion of calcium carbonate in the granules, as described in Examples 68 through 70. The ice-melting tests were performed at −3.9° C. at 60 min exposure. 4.17 g of the solid de-icer was tested in each case as described in Experimental Procedures, Section 5.

| Example | Loaded Composition [obtained as described in] | Load of De-icing Chemicals in Granules, w/w (estimate) | Ice Temperature ° C. | Brine Volume, mL |
|---|---|---|---|---|
| 242 | Calcium Chloride [Example 68] | 24% | −3.9 | 1.8 |
| 243 | Calcium Nitrate [Example 69] | 34% | −3.9 | 0.5 |
| 244 | Calcium Acetate [Example 70] | 32% | −3.9 | 1.3 |

F. Ice-penetration capability—Liquid De-icers

EXAMPLES 245 THROUGH 263

These Examples describe test results for sodium lactate, potassium acetate, and their compositions, obtained in Examples 1 and 3, 7 through 12, and 30 through 34.

Examples 245 and 246

The sodium lactate solution obtained in Example 1 was diluted with deionized water to a concentration of 55% w/w. Ice-penetration capability was determined as described in the EXPERIMENTAL PROCEDURES, Section 6.

TABLE 16

Dynamics of ice penetration by 50% w/w water solution of sodium lactate at −3.9° C. and −9.4° C.

| Example | Time, min | Ice Temperature ° C. | Penetration Depth, mm |
|---|---|---|---|
| 245 | 5 | −3.9 | 0.5 |
|  | 10 | −3.9 | 0.5 |
|  | 15 | −3.9 | 1 |
|  | 20 | −3.9 | 1 |
|  | 30 | −3.9 | 1.5 |
|  | 45 | −3.9 | 1.5 |
|  | 60 | −3.9 | 2 |
| 246 | 5 | −9.4 | 0 |
|  | 10 | −9.4 | 0.2 |
|  | 15 | −9.4 | 0.5 |
|  | 20 | −9.4 | 0.5 |
|  | 30 | −9.4 | 0.75 |
|  | 45 | −9.4 | 1 |
|  | 60 | −9,4 | 1 |

Examples 247–260

The procedure of Examples 245 and 246 was repeated, but with the difference that the sodium lactate/potassium acetate compositions obtained in Examples 3 (and diluted) and 7 through 12 were tested. For brevity, ice-penetration capability in Table 17 is reported only for 60 min data points. NaLa and KAc in the Table stand for sodium lactate and potassium acetate.

TABLE 17

Ice-penetration capability of sodium lactate-potassium acetate compositions (from 0 to 100% w/w of each ingredient) at −3.9° C. and −9.4° C. at 60 min exposure

| Example | NaLa/KAc Composition, Weight Fraction of Solids, % | Concentration w/w | Ice Temperature ° C. | Penetration Depth, mm |
|---|---|---|---|---|
| 245 | 100–0 (Sodium Lactate) | 50% | −3.9 | 2 |
| 247 | 95–5 | 50% | −3.9 | 2 |
| 248 | 90–10 | 50% | −3.9 | 2 |
| 249 | 80–20 | 51% | −3.9 | 2 |
| 250 | 50–50 | 51% | −3.9 | 2.5 |
| 251 | 20–80 | 52% | −3.9 | 2.5 |
| 252 | 10–90 | 52% | −3.9 | 2.5 |
| 253 | 0–100 (Potassium Acetate) | 52% | −3.9 | 2.5 |
| 246 | 100–0 (Sodium Lactate) | 50% | −9.4 | 1 |
| 254 | 95–5 | 50% | −9.4 | 1 |
| 255 | 90–10 | 50% | −9.4 |  |
| 256 | 80–20 | 51% | −9.4 | 1 |
| 257 | 50–50 | 51% | −9.4 | 1.2 |
| 258 | 20–80 | 52% | −9.4 | 1.2 |
| 259 | 10–90 | 52% | −9.4 | 1.2 |
| 260 | 0–100 (Potassium Acetate) | 52% | −9.4 | 1.5 |

Examples 261–263

The procedure of Examples 245 and 246 was repeated, but with the difference that the triple and quadruple salt compositions, obtained in Examples 30 through 34, were tested. For brevity, ice-penetration capability in the Table is reported only for 60 min data points.

TABLE 18

Ice-penetration capability of sodium lactate-based triple and quadruple compositions at −3.9° C. at 60 min exposure

| Example | Triple and Quadruple Salt Compositions (Weight Fraction of Solids, %) | Concentration w/w | Ice Temperature ° C. | Penetration Depth, mm |
|---|---|---|---|---|
| 261 | Sodium Lactate (94%) - Sodium Acetate (3%) - Sodium Succinate (3%) | 50% | −3.9 | 2 |
| 262 | Sodium Lactate (89%) - Sodium Acetate (3%) - Sodium Succinate (3%) - Sodium Formate (5%) | 50% | −3.9 | 2.5 |
| 263 | Potassium Lactate (85%) - Potassium Acetate (5%) - Potassium Succinate (5%) Potassium Formate (5%) | 51% | −3.9 | 2.5 |

EXAMPLES 264 THROUGH 288

The procedure of Examples 245 and 246 was repeated, but with the difference that some other double-salt compositions and their constituent salts, obtained in Examples 1 through 5, and 16 through 29, were tested. For brevity, ice-penetration capability in the Table is reported only for 60 min data points.

TABLE 19

Ice-penetration capability of organic acid-based compositions and their ingredients (sodium and potassium salts of lactic, succinic, and acetic acids) at −3.9° C. and −9.4° C. at 60 min exposure

| Example | Double Salt Compositions (Weight Fraction of Solids, %) and Ingredients | Concentration | Ice Temperature ° C. | Penetration Depth, mm |
|---|---|---|---|---|
| 264 | Sodium Lactate (100%) | 55% | −3.9 | 2.5 |
| 245 |  | 50% | −3.9 | 2 |
| 265 | Sodium Succinate (100%) | 30% | −3.9 | 0.5 |
| 266 | Potassium Lactate (100%) | 55% | −3.9 | 3 |
| 267 |  | 50% | −3.9 | 2.5 |
| 268 | Potassium Succinate (100%) | 50% | −3.9 | 1.5 |
| 269 | Potassium Lactate (95%) - Potassium Acetate (5%) | 55% | −3.9 | 2.5 |
| 270 | Potassium Lactate (90%) - Potassium Acetate (10%) | 54% | −3.9 | 2.5 |
| 253 | Potassium Acetate (100%) | 52% | −3.9 | 2.5 |
| 271 |  | 50% | −3.9 | 2.5 |
| 272 | Sodium Lactate (100%) | 55% | −9.4 | 1.2 |
| 246 |  | 50% | −9.4 | 1 |
| 273 | Sodium Succinate (100%) | 24% | −9.4 | 0 |
| 274 | Sodium Lactate (95%) - Sodium Succinate (5%) | 50% | −9.4 | 1 |
| 275 | Sodium Lactate (90%) - Sodium Succinate (10%) | 47% | −9.4 | 1 |
| 276 | Potassium Lactate (100%) | 55% | −9.4 | 1 |
| 277 |  | 50% | −9.4 | 0.5 |
| 278 | Potassium Succinate (100%) | 50% | −9.4 | 0.25 |
| 279 | Potassium Lactate (90%) - Potassium Succinate (10%) | 50% | −9.4 | 1 |
| 280 | Potassium Lactate (80%) - Potassium Succinate (20%) | 50% | −9.4 | 1 |
| 281 | Potassium Lactate (50%) - Potassium Succinate (50%) | 50% | −9.4 | 0.75 |
| 282 | Potassium Lactate (95%) - Potassium Acetate (5%) | 50% | −9.4 | 1 |
| 283 | Potassium Lactate (90%) - Potassium Acetate (10%) | 50% | −9.4 | 1 |
| 284 | Potassium Acetate (100%) | 50% | −9.4 | 1.5 |
| 285 | Potassium Lactate (90%) - Potassium Formate (10%) | 50% | −9.4 | 0.75 |
| 286 | Potassium Lactate (50%) - Potassium Formate (50%) | 50% | −9.4 | 0.75 |
| 287 | Potassium Lactate (10%) - Potassium Formate (50%) | 50% | −9.4 | 0.5 |
| 288 | Potassium Lactate (95%) - Sodium Chloride (5%) | 50% | −9.4 | 1 |

COMPARATIVE EXAMPLES 289 THROUGH 304

These Examples describe test results for conventional liquid de-icers and/or those de-icers that are not commonly in practical use but generally known. The data are given for comparative purposes. Ice-penetration capability of the chemicals listed in the following Table was determined as described in the EXPERIMENTAL PROCEDURES, Section 6. For brevity, ice-penetration capability is reported only for 60 min data points.

TABLE 20

Ice-penetration capability of conventional liquid de-icers and/or de-icers not commonly in practical use but generally known, at −3.9° C. and −9.4° C. at 60 min exposure

| Example | De-iceing Chemicals | Concentration | Ice Temperature, ° C. | Penetration Depth, mm |
|---|---|---|---|---|
| 289 | Ethylene glycol | 100% | −3.9 | 5.5 |
| 253 | Potassium Acetate | 52% | −3.9 | 2.5 |
| 271 |  | 50% | −3.9 | 2.5 |
| 290 | Sodium Acetate | 50% | −3.9 | 2 |
| 291 | Potassium Formate | 50% | −3.9 | 2 |
| 292 | Calcium Chloride | 37.3% | −3.9 | 3 |
| 293 | Sodium Chloride | 26% | −3.9 | 2 |
| 294 | Sodium Formate | 50% | −3.9 | 5 |
| 295 | Ethylene glycol | 100% | −9.4 | 2 |
| 296 | Propylene glycol | 100% | −9.4 | 1.5 |
| 297 |  | 55% | −9.4 | 0 |
| 298 | Ethyl Alcohol | 100% | −9.4 | 0 |
| 299 | Calcium Chloride | 37% | −9.4 | 1–1.5 |
| 300 | Potassium Formate | 50% | −9.4 | 0 |
| 260 | Potassium Acetate | 52% | −9.4 | 1.5 |
| 301 |  | 50% | −9.4 | 1.5 |
| 302 | Sodium Chloride | 26% | −9.4 | 0–0.5 |
| 303 | Sodium Acetate | 34% | −9.4 | 0 |
| 304 | Sodium Formate | 50% | −9.4 | 1 |

G. Ice-penetration capability—Solid De-icers

EXAMPLE 305

BIODAC 16/30-based solid de-icer loaded with sodium lactate (45%)/potassium acetate (55%) composition as described in Example 35, was tested for ice-penetration capability as described in the EXPERIMENTAL PROCEDURES, Section 7.

TABLE 21

Dynamics of ice penetration by BIODAC-based solid de-icer loaded with sodium lactate (45%)-potassium acetate (55%) composition (obtained in Example 35) at −3.9° C. 24 mg of solid de-icer were used.

| Example | Time, min | Ice Temperature, ° C. | Penetration Depth, mm |
|---|---|---|---|
| 305 | 10 | −3.9 | 1 |
|  | 20 | −3.9 | 1 |
|  | 30 | −3.9 | 1.5 |
|  | 45 | −3.9 | 2 |
|  | 60 | −3.9 | 2.5 |

EXAMPLES 306 THROUGH 323

The test procedure of Examples 305 was repeated for other solid granular BIODAC-based de-icers, obtained in Examples 35–52. For brevity, ice-penetration capability in Table 22 is reported only for 60 min data points. In the Table, NaLa and KAc stand for sodium lactate and potassium acetate.

TABLE 22

Ice-penetration capability of BIODAC granules loaded with organic and inorganic de-icers, at −3.9° C. and −9.4° C. at 60 min exposure. 22–26 mg of the solid de-icer were tested in each case as described in Experimental Procedures, Section 7.

| Example | Loaded Composition [obtained as described in] | Load of De-icing Chemicals in Granules, w/w | Ice Temperature ° C. | Penetration Depth, mm |
|---|---|---|---|---|
| 306 | NaLa (45%)-KAc (55%) [Example 47] | 46% | −3.9 | 3 |
| 307 | NaLa (50%)-KAc (50%) [Example 44] | 45% | −3.9 | 3 |
| 305 | NaLa (45%)-KAc (55%) [Example 35] | 34% | −3.9 | 2.5 |
| 308 | NaLa (45%)-KAc (55%) [Example 42] | 28% | −3.9 | 2 |
| 309 | Potassium Acetate (100%) [Example 37] | 49% | −3.9 | 3.5 |
| 310 | Potassium Acetate (100%) [Example 65] | 43% | −3.9 | 3 |
| 311 | Potassium Acetate (100%) [Example 36] | 42% | −3.9 | 3 |
| 312 | Potassium Acetate (100%) [Example 64] | 40% | −3.9 | 3 |
| 313 | Potassium Acetate (100%) [Example 39] | 36% | −3.9 | 2 |
| 314 | Sodium Lactate (100%) [Example 50] | 42% | −3.9 | 1.5 |
| 315 | Sodium Lactate (100%) [Example 52] | 42% | −3.9 | 2 |
| 316 | Sodium Lactate (100%) [Example 51] | 41% | −3.9 | 1.5 |
| 317 | Sodium Lactate (100%) [Example 43] | 40% | −3.9 | 1.5 |
| 318 | Sodium Lactate (100%) [Example 63] | 39% | −3.9 | 1.5 |
| 319 | Sodium Lactate (100%) [Example 46] | 33% | −3.9 | 1 |
| 320 | Sodium Chloride (100%) [Example 48] | 16% | −3.9 | 1.3 |
| 321 | Calcium Chloride (100%) [Example 49] | 26% | −3.9 | 2.5 |
| 322 | Potassium Acetate (100%) [Example 37] | 49% | −9.4 | 2 |
| 323 | Potassium Acetate (100%) [Example 38] | 41% | −9.4 | 1.5 |

EXAMPLES 324 THROUGH 328

The test procedure of Example 305 was repeated for solid granular BIODAC-based de-icers, obtained in Examples 53 through 57. For brevity, ice-penetration capability in Table 23 is reported only for 60 min data points. In the Table, NaLa and KAc stand for sodium lactate and potassium acetate.

TABLE 23

Ice-penetration capability of BIODAC granules loaded with sodium lactate-potassium acetate compositions, at −3.9° C. and 60 min exposure. 22–26 mg of solid de-icer were tested in each case as described in Experimental Procedures, Section 7.

| Example | Loaded Composition [obtained as described in] | Load of De-icing Chemicals in Granules, w/w | Ice Temperature ° C. | Penetration Depth, mm |
|---|---|---|---|---|
| 324 | NaLa (50%)-KAc (50%) [Example 48] | 0.04% | −3.9 | 0 |
| 325 | NaLa (50%)-KAc (50%) [Example 49] | 5% | −3.9 | 0 |
| 326 | NaLa (50%)-KAc (50%) [Example 50] | 18% | −3.9 | 0.5 |
| 327 | NaLa (50%)-KAc (50%) [Example 51] | 23% | −3.9 | 1.5 |
| 328 | NaLa (50%)-KAc (50%) [Example 57] | 35% | −3.9 | 2–3 |

EXAMPLES 329 THROUGH 334

The test procedure of Example 305 was repeated for solid granular BIODAC-based de-icers, obtained in Examples 58 through 63, and those similar in composition. For brevity, ice-penetration capability in Table 24 is reported only for 60 min data points. In the Table, NaLa and KAc stand for sodium lactate and potassium acetate.

TABLE 24

The ice-penetration capability of BIODAC granules loaded with sodium lactate-potassium acetate compositions, at −3.9° C. and −9.4° C. at 60 min exposure. 22–26 mg of solid de-icer were tested in each case.

| Example | Loaded Composition [obtained as described in] | Load of De-icing Chemicals in Granules, w/w | Ice Temperature ° C. | Penetration Depth, mm |
|---|---|---|---|---|
| 309 | Potassium Acetate (100%) [Example 37] | 49% | −3.9 | 3.5 |
| 310 | Potassium Acetate (100%) [Example 65] | 43% | −3.9 | 3 |
| 311 | Potassium Acetate (100%) [Example 36] | 42% | −3.9 | 3 |
| 312 | Potassium Acetate (100%) [Example 64] | 40% | −3.9 | 3 |
| 313 | Potassium Acetate (100%) [Example 39] | 36% | −3.9 | 2 |
| 329 | NaLa (20%)-KAc (80%) [Example 59] | 33% | −3.9 | 2 |
| 330 | NaLa (40%)-KAc (60%) [Example 60] | 38% | −3.9 | 2 |
| 328 | NaLa (50%)-KAc (50%) [Example 57] | 35% | −3.9 | 2–3 |
| 331 | NaLa(60%)-KAc (40%) [Example 61] | 36% | −3.9 | 2 |

TABLE 24-continued

The ice-penetration capability of BIODAC granules loaded
with sodium lactate-potassium acetate compositions,
at −3.9° C. and −9.4° C.
at 60 min exposure. 22–26 mg of solid de-icer
were tested in each case.

| Example | Loaded Composition [obtained as described in] | Load of De-icing Chemicals in Granules, w/w | Ice Temperature ° C. | Penetration Depth, mm |
|---|---|---|---|---|
| 332 | NaLa (80%)-KAc (20%) [Example 62] | 41% | −3.9 | 3 |
| 314 | Sodium Lactate (100%) [Example 50] | 42% | −3.9 | 1.5 |
| 315 | Sodium Lactate (100%) [Example 52] | 42% | −3.9 | 2 |
| 316 | Sodium Lactate (100%) [Example 51] | 41% | −3.9 | 1.5 |
| 317 | Sodium Lactate (100%) [Example 43] | 40% | −3.9 | 1.5 |
| 318 | Sodium Lactate (100%) [Example 63] | 39% | −3.9 | 1.5 |
| 319 | Sodium Lactate (100%) [Example 46] | 33% | −3.9 | 1 |
| 322 | Potassium Acetate (100%) [Example 37] | 49% | −9.4 | 2 |
| 333 | Potassium Acetate (100%) [Example 64] | 40% | −9.4 | 1 |
| 334 | Potassium Acetate (100%) [Example 39] | 36% | −9.4 | 1 |

EXAMPLES 335 AND 336

The test procedure of Example 305 was repeated for the solid granular low-ash BIODAC-based de-icers obtained in Examples 66 and 67.

TABLE 25

Ice-penetration capability of BIODAC
low-ash granules loaded with sodium lactate
(50%)-potassium acetate (50%) composition
at −3.9° C. at 60 min exposure. 22–26 mg
of the solid de-icer were tested in each case as
described in Experimental Procedures, Section 7.

| Example | Load of De-icing Chemicals in Granules, w/w [obtained as described in] | Ice Temperature ° C. | Penetration Depth, mm |
|---|---|---|---|
| 335 | 54% [Example 66] | −3.9 | 3 |
| 336 | 52% [Example 67] | −3.9 | 1 |

EXAMPLES 337 THROUGH 339

These Examples describe test results for BIODAC-based solid de-icers obtained by chemical conversion of the calcium carbonate content in BIODAC granules as described in Examples 68 through 70. The granular solid de-icers were tested for ice-penetration capability as described in the EXPERIMENTAL PROCEDURES, section 7. For brevity, de-icing capability in the following Table is reported only for 60 min data points.

TABLE 26

Ice-penetration capability of BIODAC granules loaded
with solid inorganic de-icers
obtained by chemical conversion of calcium carbonate
in the granules. The ice-
penetration tests were performed at −3.9° C.
at 60 min exposure. 22–26 mg of the
solid de-icer were tested in each case.

| Example | Loaded Composition [obtained as described in] | Load of De-iceing Chemicals in Granules, w/w (estimate) | Ice Temperature ° C. | Penetration Depth, mm |
|---|---|---|---|---|
| 337 | Calcium Chloride [Example 68] | 24% | −3.9 | 2 |
| 338 | Calcium Nitrate [Example 69] | 34% | −3.9 | 2 |
| 339 | Calcium Acetate [Example 70] | 32% | −3.9 | 0.5 |

H. Freezing Point Depression

EXAMPLE 340

This Example describes a typical test for freezing point determination, in this particular case for a 30% w/w solution of a 20%–80% mixture of sodium lactate and potassium acetate, respectively. Details of the test are described in the EXPERIMENTAL PROCEDURES, Section 8. The temperature of the test solution was recorded every 15 sec, but in the Table below only selected time-temperature points are given in the area before and after the freezing point is attained, with the freezing point plateau shadowed. In this particular case, the freezing point was equal to −23.3±0.2° C.

TABLE 27

The dynamics of cooling down and freezing a 30% w/w solution of
20%-80% mixture of sodium lactate and potassium acetate, respectively.
The freezing point plateau is shadowed.

| Time, min | Temperature ° C. | Time, min | Temperature ° C. | Time, min | Temperature ° C. |
|---|---|---|---|---|---|
| 0:00 | 20.0 | 25:30 | −23.5 | 29:45 | −23.3 |
| 1:00 | 17.4 | 25:45 | −23.5 | 30:00 | −23.4 |
| 2:00 | 14.8 | 26:00 | −23.5 | 30:15 | −23.5 |
| 5:00 | 7.9 | 26:15 | −23.5 | 30:30 | −23.6 |
| 10:00 | −2.2 | 26:30 | −23.5 | 30:45 | −23.7 |
| 15:00 | −10.4 | 26:45 | −23.4 | 31:00 | −23.8 |
| 20:00 | −17.6 | 27:00 | −23.3 | 31:15 | −23.9 |
| 22:00 | −20.1 | 27:15 | −23.3 | 31:30 | −24.2 |
| 23:00 | −21.3 | 27:30 | −23.3 | 31:45 | −24.3 |
| 23:30 | −21.8 | 27:45 | −23.2 | 32:00 | −24.4 |
| 23:45 | −22.1 | 28:00 | −23.2 | 32:15 | −24.6 |
| 24:00 | −22.4 | 28:15 | −23.2 | 32:30 | −24.7 |
| 24:15 | −22.6 | 28:30 | −23.2 | 33:00 | −25.0 |
| 24:30 | −22.8 | 28:45 | −23.2 | 34:00 | −25.6 |
| 24:45 | −23.0 | 29:00 | −23.2 | 35:00 | −26.2 |
| 25:00 | −23.2 | 29:15 | −23.2 | 36:00 | −26.8 |
| 25:15 | −23.4 | 29:30 | −23.3 | 37:00 | −27.4 |

EXAMPLE 341

The procedure of Example 340 was repeated, but with the difference that a 26% w/w solution of a 50%-50% mixture of sodium lactate and potassium acetate was tested for freezing point depression. The freezing point plateau in Table 28 is shadowed. In this particular case, the freezing point was equal to −17.8°±0.2° C.

TABLE 28

The dynamics of cooling down and freezing a 26% w/w solution of 50%-50% mixture of sodium lactate and potassium acetate, respectively. The freezing point plateau is shadowed.

| Time, min | Temperature °C | Time, min | Temperature °C | Time, min | Temperature °C |
|---|---|---|---|---|---|
| 0:00 | 20.5 | 13:45 | −16.5 | 18:00 | −18.2 |
| 0:30 | 19.0 | 14:00 | −16.9 | 18:15 | −18.4 |
| 1:00 | 17.2 | 14:15 | −17.2 | 18:30 | −18.6 |
| 2:00 | 13.8 | 14:30 | −17.5 | 18:45 | −18.7 |
| 3:00 | 10.4 | 14:45 | −17.8 | 19:00 | −18.9 |
| 4:00 | 6.4 | 15:00 | −18.0 | 19:15 | −19.2 |
| 5:00 | 4.2 | 15:15 | −18.0 | 19:30 | −19.4 |
| 7:30 | −2.7 | 15:30 | −18.0 | 19:45 | −19.5 |
| 9:00 | −5.7 | 15:45 | −17.9 | 20:00 | −19.7 |
| 10:00 | −8.8 | 16:00 | −17.8 | 20:15 | −19.9 |
| 11:00 | −11.0 | 16:15 | −17.6 | 20:30 | −20.1 |
| 11:30 | −12.0 | 16:30 | −17.6 | 20:45 | −20.3 |
| 12:00 | −13.1 | 16:45 | −17.6 | 21:00 | −20.5 |
| 12:30 | −14.1 | 17:00 | −17.7 | 21:30 | −20.9 |
| 13:00 | −15.1 | 17:15 | −17.8 | 22:00 | −21.3 |
| 13:15 | −15.5 | 17:30 | −18.0 | 22:30 | −21.6 |
| 13:30 | −16.1 | 17:45 | −18.1 | 23:00 | −22.0 |

EXAMPLE 342

The procedure of Examples 340 and 341 was repeated, but with the difference that an individual component of the mixture, potassium acetate, as a 25% w/w solution, was tested for freezing point depression. The freezing point plateau in the Table below is shadowed. In this particular case, the freezing point was equal to −19.0°±0.1° C.

TABLE 29

The dynamics of cooling down and freezing a 25% w/w solution of potassium acetate. The freezing point plateau is shadowed.

| Time, min | Temperature °C | Time, min | Temperature °C | Time, min | Temperature °C |
|---|---|---|---|---|---|
| 0:00 | 20.6 | 16:30 | −19.1 | 20:45 | −19.9 |
| 1:00 | 17.2 | 16:45 | −19.1 | 21:00 | −20.1 |
| 2:00 | 14.1 | 17:00 | −19.1 | 21:15 | −20.2 |
| 3:00 | 11.0 | 17:15 | −18.9 | 21:30 | −20.3 |
| 4:00 | 7.9 | 17:30 | −18.9 | 21:45 | −20.5 |
| 5:00 | 4.8 | 17:45 | −18.9 | 22:00 | −20.6 |
| 10:00 | −7.2 | 18:00 | −18.9 | 22:15 | −20.8 |
| 11:00 | −9.4 | 18:15 | −18.9 | 22:30 | −21.0 |
| 12:00 | −11.4 | 18:30 | −18.9 | 22:45 | −21.2 |
| 13:00 | −13.4 | 18:45 | −18.9 | 23:00 | −21.3 |
| 14:00 | −15.2 | 19:00 | −19.1 | 23:15 | −21.5 |
| 14:30 | −16.1 | 19:15 | −19.2 | 23:30 | −21.7 |
| 15:00 | −17.0 | 19:30 | −19.3 | 23:45 | −21.9 |
| 15:30 | −17.8 | 19:45 | −19.4 | 24:00 | −22.0 |
| 15:45 | −18.2 | 20:00 | −19.5 | 24:15 | −22.2 |
| 16:00 | −18.5 | 20:15 | −19.6 | 24:30 | −22.4 |
| 16:15 | −18.8 | 20:30 | −19.7 | 25:00 | −22.8 |

EXAMPLE 343

The procedure of Examples 340 through 342 was repeated, but with the difference that another individual component of the mixture, sodium lactate, as a 37% w/w solution, was tested for freezing point depression. The freezing point plateau in the Table below is shadowed. In this particular case, the freezing point was equal to −31.9°±0.1° C.

TABLE 30

The dynamics of cooling down and freezing a 37% w/w solution of sodium lactate. The freezing point plateau is shadowed.

| Time, min | Temperature °C | Time, min | Temperature °C | Time, min | Temperature °C |
|---|---|---|---|---|---|
| 0:00 | 19.6 | 27:30 | −31.9 | 32:00 | −32.3 |
| 2:00 | 13.4 | 27:45 | −32.0 | 32:30 | −32.7 |
| 5:00 | 4.9 | 28:00 | −32.0 | 33:00 | −33.0 |
| 10:00 | −6.9 | 28:15 | −32.0 | 33:30 | −33.3 |
| 12:00 | −11.0 | 28:30 | −32.0 | 34:00 | −33.6 |
| 14:00 | −14.7 | 28:45 | −32.0 | 35:00 | −34.5 |
| 16:00 | −18.2 | 29:00 | −32.0 | 36:00 | −35.1 |
| 18:00 | −21.3 | 29:15 | −31.9 | 37:00 | −35.7 |
| 20:00 | −24.3 | 29:30 | −31.9 | 38:00 | −36.6 |
| 22:00 | −26.9 | 29:45 | −31.8 | 39:00 | −37.2 |
| 24:00 | −29.4 | 30:00 | −31.8 | 40:00 | −38.0 |
| 25:00 | −30.3 | 30:15 | −31.8 | 41:00 | −38.7 |
| 26:00 | −31.2 | 30:30 | −31.8 | 42:00 | −39.3 |
| 26:30 | −31.5 | 30:45 | −31.8 | 43:00 | −40.0 |
| 26:45 | −31.6 | 31:00 | −31.9 | 44:00 | −40.6 |
| 27:00 | −31.7 | 31:15 | −32.0 | 46:00 | −41.9 |
| 27:15 | −31.8 | 31:30 | −32.1 | 48:00 | −43.0 |

EXAMPLE 344

The procedure of Examples 340 through 343 was repeated, but with the difference that a triple component composition, in a ratio of 90% sodium lactate-5% sodium succinate-5% sodium acetate, as prepared in Example 31 and diluted to 29% w/w, was tested for freezing point depression. The freezing point plateau in the Table below is shadowed. In this particular case, the freezing point was equal to −18.8°±0.1° C.

TABLE 31

The dynamics of cooling down and freezing a 29% w/w solution of 90%-5%-5% mixture of sodium lactate, sodium succinate and sodium acetate, respectively. The freezing point plateau is shadowed.

| Time, min | Temperature °C | Time, min | Temperature °C | Time, min | Temperature °C |
|---|---|---|---|---|---|
| 0:00 | 20.8 | 17:15 | −18.5 | 20:15 | −19.1 |
| 2:00 | 14.6 | 17:30 | −18.7 | 20:30 | −19.3 |
| 4:00 | 8.6 | 17:45 | −18.8 | 20:45 | −19.5 |
| 6:00 | 3.1 | 18:00 | −18.9 | 21:00 | −19.7 |
| 8:00 | −1.8 | 18:15 | −18.9 | 21:15 | −19.8 |
| 10:00 | −6.4 | 18:30 | −18.8 | 21:30 | −20.0 |
| 12:00 | −10.4 | 18:45 | −18.8 | 21:45 | −20.2 |
| 14:00 | −14.0 | 19:00 | −18.7 | 22:00 | −20.4 |
| 15:00 | −15.8 | 19:15 | −18.7 | 22:15 | −20.6 |
| 16:00 | −17.3 | 19:30 | −18.7 | 22:30 | −20.8 |
| 16:30 | −17.9 | 19:45 | −18.8 | 22:45 | −20.9 |
| 17:00 | −18.4 | 20:00 | −18.9 | 23:00 | −30.1 |

EXAMPLE 345

The procedure of Example 344 was repeated with the only difference that the triple mixture sodium lactate (90%)-sodium succinate (5%)-sodium acetate (5%), prepared in Example 31 was not diluted, and tested as a 50% solution. The freezing point was below −51° C.

EXAMPLE 346

The procedure of Examples 340 through 345 was repeated, but with the difference that a triple component composition, in a ratio of 90% potassium lactate-5% potassium succinate-5% potassium acetate, as prepared in Example 33, was diluted to 35.5% w/w and tested. The freezing point plateau in the Table below is shadowed. In this particular case, the freezing point was equal to −21.6°±0.1° C.

TABLE 32

The dynamics of cooling down and freezing a 35.5% w/w solution of 90%-5%-5% mixture of potassium lactate, potassium succinate and potassium acetate, respectively. The freezing point plateau is shadowed.

| Time, min | Temperature ° C. | Time, min | Temperature ° C. | Time, min | Temperature ° C. |
|---|---|---|---|---|---|
| 0:00 | 20.0 | 19:45 | −21.4 | 23:30 | −22.1 |
| 2:00 | 13.8 | 20:00 | −21.5 | 23:45 | −22.4 |
| 5:00 | 5.0 | 20:15 | −21.5 | 24:00 | −22.5 |
| 8:00 | −2.2 | 20:30 | −21.5 | 24:15 | −22.7 |
| 10:00 | −6.4 | 20:45 | −21.6 | 24:30 | −22.9 |
| 12:00 | −10.3 | 21:00 | −21.6 | 24:45 | −23.1 |
| 14:00 | −13.8 | 21:15 | −21.6 | 25:00 | −23.3 |
| 16:00 | −17.0 | 21:30 | −21.6 | 25:15 | −23.4 |
| 17:00 | −18.5 | 21:45 | −21.6 | 25:30 | −23.6 |
| 17:30 | −19.3 | 22:00 | −21.6 | 25:45 | −23.8 |
| 18:00 | −20.0 | 22:15 | −21.6 | 26:00 | −24.1 |
| 18:30 | −20.5 | 22:30 | −21.7 | 26:15 | −24.3 |
| 19:00 | −21.0 | 22:45 | −21.7 | 26:30 | −24.5 |
| 19:15 | −21.1 | 23:00 | −21.8 | 26:45 | −24.7 |
| 19:30 | −21.3 | 23:15 | −22.0 | 27:00 | −25.0 |

EXAMPLE 347

The procedure of Examples 340 through 346 was repeated, but with the difference that a quadruple component composition, in a ratio of 89% sodium lactate-5% sodium formate-3% sodium succinate-3% sodium acetate, as prepared in Example 32 and diluted to 31% w/w, was tested for freezing point depression. The freezing point plateau in the Table below is shadowed. In this particular case, the freezing point was equal to −21.5°±0.2° C.

TABLE 33

The dynamics of cooling down and freezing a 31% w/w solution of 89%-5%-3%-3% mixture of sodium lactate, sodium formate, sodium succinate and sodium acetate, respectively. The freezing point plateau is shadowed.

| Time, min | Temperature ° C. | Time, min | Temperature ° C. | Time, min | Temperature ° C. |
|---|---|---|---|---|---|
| 0:00 | 20.1 | 28:00 | −21.6 | 31:45 | −21.4 |
| 2:00 | 15.5 | 28:15 | −21.6 | 32:00 | −21.5 |
| 5:00 | 9.1 | 28:30 | −21.6 | 32:15 | −21.6 |
| 10:00 | 0.0 | 28:45 | −21.6 | 32:30 | −21.7 |
| 15:00 | −7.5 | 29:00 | −21.6 | 32:45 | −21.9 |
| 20:00 | −14.2 | 29:15 | −21.6 | 33:00 | −22.0 |
| 22:00 | −16.2 | 29:30 | −21.5 | 33:30 | −22.3 |
| 24:00 | −18.3 | 29:45 | −21.5 | 34:00 | −22.7 |
| 25:00 | −19.4 | 30:00 | −21.4 | 34:30 | −22.9 |
| 26:00 | −20.3 | 30:15 | −21.4 | 35:00 | −23.2 |
| 26:30 | −20.8 | 30:30 | −21.3 | 35:30 | −23.5 |
| 27:00 | −21.1 | 30:45 | −21.3 | 36:00 | −23.8 |
| 27:15 | −21.3 | 31:00 | −21.3 | 36:30 | −24.2 |
| 27:30 | −21.4 | 31:15 | −21.3 | 37:00 | −24.4 |
| 27:45 | −21.5 | 31:30 | −21.3 | 38:00 | −24.9 |

EXAMPLES 348 THROUGH 360

These Examples summarize freezing point depression values for solutions of sodium lactate, potassium acetate and the compositions thereof as obtained in examples 1–12. Freezing point depression was determined as described in the EXPERIMENTAL PROCEDURES, Section 8, and Examples 340 through 347.

TABLE 34

Freezing point depression values for solutions of sodium lactate, potassium acetate, and their compositions.

| Example | Sodium Lactate/Potassium Acetate Compositions, Weight Fraction of Solids, % | Concentration, w/w | Freezing Point, ° C. |
|---|---|---|---|
| 348 | 100–0 (Sodium Lactate) | 27% | −15.6 ± 0.2 |
| 343 | | 37% | −31.9 ± 0.1 |
| 349 | | 58% | Below −52 |
| 350 | 95–5 | 24% | −12.9 ± 0.2 |
| 351 | | 40% | −45.5 ± 0.3 |
| 352 | 80–20 | 24% | −14.5 ± 0.3 |
| 353 | | 40% | −46.9 ± 1.0 |
| 341 | 50–50 | 26% | −17.8 ± 0.2 |
| 354 | | 36% | −37.4 ± 0.2 |
| 355 | | 38% | −41.0 ± 1.0 |
| 356 | | 46% | Below −52 |
| 357 | | 57% | Below −52 |
| 358 | 20–80 | 25.5% | −18.0 ± 0.3 |
| 340 | | 30% | −23.3 ± 0.2 |
| 342 | 0–100 (Potassium Acetate) | 25% | −19.0 ± 0.1 |
| 359 | | 37.5% | −44.8 ± 0.5 |
| 360 | | 54.5% | Below −52 |

It appears from these Examples that all tested compositions based on sodium lactate and potassium acetate showed low freezing points, in the range of −12°–20° C. for 24–26% w/w solutions to −45°–47° C. for 37–40% w/w solutions, and below −52° C. for 46% and more concentrated de-icing compositions. It also appears that the higher the fraction of potassium acetate in a mixture with sodium lactate, the lower the freezing point of the double composition (e.g., from −32° C. for sodium lactate to −45° C. for potassium acetate for 37% w/w solutions, through 38°–42° C. for the 50-50 mixture) will be.

EXAMPLES 361 THROUGH 369

These Examples summarize freezing point depression values determined for solutions of salts of some other organic acids (with some earlier Examples included). Freezing point depression was determined as described in the EXPERIMENTAL PROCEDURES, Section 8, and Examples 340 through 360.

TABLE 35

Freezing point depression values for solutions of some acetates, lactates, succinates, and sodium formate.

| Example | Salts of Organic Acids, % w/w | Concentration, w/w | Freezing Point, ° C. |
|---|---|---|---|
| 342 | Potassium acetate | 25% | −19.0 ± 0.1 |
| 359 | | 37.5% | −44.8 ± 0.5 |
| 360 | | 54.5% | Below −52 |
| 361 | Sodium acetate | 15.5% | −10.9 ± 0.1 |
| 362 | | 32% | −31.7 ± 0.1 |
| 363 | Potassium lactate | 25% | −11.2 ± 0.1 |
| 364 | | 45% | −38.9 ± 0.5 |
| 348 | Sodium lactate | 27% | −15.6 ± 0.2 |
| 343 | | 37% | −31.9 ± 0.1 |
| 349 | | 58% | Below −52 |
| 365 | Potassium succinate | 38% | −26.6 ± 0.1 |
| 366 | | 46% | Below −46 |
| 367 | Sodium succinate | 14% | −5.2 ± 0.1 |
| 368 | | 25% (saturated solution) | −10.8 ± 0.1 |
| 369 | Sodium formate | 24% | −19.1 ± 0.1 |

It appears from these Examples that all the listed salts of organic acids are capable of significantly depressing the freezing point of water: for 35% w/w solutions— extrapolated and/or interpolated—the freezing point is in the range of −20° C. to −30° C., or even down to −40° C. for potassium acetate, which is the most effective in this regard.

COMPARATIVE EXAMPLES 370 THROUGH 383

These Examples describe test results for conventional liquid de-icers and/or those de-icers that are not commonly in practical use but generally known. The data are given for comparative purposes. Freezing point depression capability of the chemicals listed in the following Table was determined as described in the EXPERIMENTAL PROCEDURES, section 8.

TABLE 36

Freezing point depression values for some conventional liquid de-icers and/or de-icers that are not commonly in practical use but generally known.

| Example | De-icing Chemicals | Concentration w/w | Freezing Point, ° C. |
|---|---|---|---|
| 370 | Ethylene glycol | 24% | −12.8 ± 0.1 |
| 371 | | 50% | −46.5 ± 0.5 |
| 372 | | 100% | −13.3 ± 0.1 (super-cooled liquid; before being frozen, stayed liquid down to −28.8° C.) |
| 373 | Propylene glycol | 25% | −11.2 ± 0.1 |
| 374 | | 50% | Below −52 |
| 375 | | 100% | Below −52 |
| 376 | Ethanol | 25% | −18.7 ± 0.1 |
| 377 | | 50% | Below −52 |
| 378 | | 100% | Below −52 |
| 379 | Urea | 25% | −10.4 ± 0.1 |
| 380 | | 50% | −12.1 ± 0.1 |
| 381 | Calcium Chloride | 35% | −26.9 ± 0.3 |
| 382 | Sodium Chloride | 19% | −25.5 ± 0.1 |
| 383 | | 27% | −22.5 ± 0.1 (super-cooled liquid; before being frozen, stayed liquid down to −27.9° C.) |

It appears from the above that organic acid salts tested as freezing point depressants (Examples 340 through 369) are as good as the best more-conventional de-icers, as listed in comparative Examples 370 through 393. For example, freezing point values for 25% w/w solutions of organic acid salts are in the range of −11° C. to −19° C., compared with −11° C. to −13° C. for ethylene and propylene glycols, —10° C. for urea, and about −15° C. to −19° C. for ethanol, calcium chloride and sodium chloride.

I. Corrosion of Steel

EXAMPLE 384

This Example describes a typical test for evaluation of corrosive effects, in this particular case for 3% w/w sodium chloride solution, on cold rolled steel (C1018) coupons. Details of the test are described in the EXPERIMENTAL PROCEDURES, Section 9. In this Example, the initial pH of the NaCl solution was 5.2, initial potential 111 mV. In just three hrs after the test began (that is, after aeration of the solution had started) the optical density (at 300 mm) of the solution increased from 0 to 0.15, and in two days the optical density reached 0.26. The solution gradually turned from clear to dirty-brown, and a thick layer of brown precipitate/rust formed.

TABLE 37

Evaluation of corrosion effects of 3% w/w sodium chloride solution (initial pH 5.2) on cold rolled steel (C1018) coupons (32 ± 2 g weight)

| Week | Average weight lost (mg) | PH | mV | Average corrosion rate (mpy) |
|---|---|---|---|---|
| 0 | — | 5.2 | +111 | — |
| 1 | 157 ± 11 | 8.5 | −85 | 13.8 ± 1.0 |
| 2 | 260 ± 14 | 8.7 | −106 | 12.1 ± 0.6 |
| 3 | 299 ± 23 | 8.6 | −90 | 8.8 ± 0.7 |
| 6 | 515 ± 24 | 8.2 | −68 | 7.6 ± 0.4 |
| | | | | Mean corr. rate 10.6 ± 2.8 |

EXAMPLE 385

The procedure of Example 384 was repeated, with the difference that the initial pH value of 3% w/w sodium chloride solution was 8.0.

TABLE 38

Evaluation of corrosion effects of 3% w/w sodium chloride solution (initial pH 8.0) on cold rolled steel (C1018) coupons (32 ± 2 g weight)

| Week | Average weight lost (mg) | PH | mV | Average corrosion rate (mpy) |
|---|---|---|---|---|
| 0 | — | 8.0 | −54 | — |
| 1 | 72 ± 6 | 8.3 | −68 | 6.3 ± 0.5 |
| 2 | 114 ± 4 | 9.1 | −121 | 5.0 ± 0.2 |
| 3 | 188 ± 17 | 8.7 | −91 | 5.8 ± 0.5 |
| | | | | Mean corr. rate 5.7 ± 0.7 |

It appears from Examples 384 and 385 that 3% solutions of NaCl are more corrosive at lower pH values.

EXAMPLE 386 AND 387

The procedure of Examples 384 and 385 was repeated, with the difference that 3% w/w sodium lactate was tested for its corrosive effect on cold rolled steel, at pH 6.2 and 8.0.

TABLE 39

Evaluation of corrosion effects of 3% w/w sodium lactate solutions (initial pH values of 6.2 and 8.0) on cold rolled steel (C1018) coupons (32 ± 2 g weight)

| Example | Week | Average weight lost (mg) | pH | mV | Average corrosion rate (mpy) |
|---|---|---|---|---|---|
| 386 | 0 | — | 6.2 | 50 | — |
| | 1 | 0 | 6.6 | 26 | 0 |
| | 2 | 0 | 7.4 | −20 | 0 |
| | 3 | 0 | 7.9 | −43 | 0 |
| | 6 | 0 | 8.1 | −58 | 0 |
| 387 | 0 | — | 8.0 | −51 | — |
| | 1 | 0 | 9.0 | −111 | 0 |
| | 2 | 0 | 8.9 | −110 | 0 |
| | 3 | 0 | 8.9 | −107 | 0 |

It appears from this Example that 3% solution of sodium lactate is not corrosive at pH values between 6.2 and 8.0.

EXAMPLE 388

The procedure of Examples 384 and 385 was repeated, with the difference that deionized water (Milli-Q) was tested for its corrosive effect on cold rolled steel, at an apparent initial pH of 5.5.

TABLE 40

Evaluation of corrosion effects of deionized water (initial apparent pH 5.5) on cold rolled steel (C1018) coupons (32 ± 2 g weight)

| Week | Average weight lost (mg) | pH | mV | Average corrosion rate (mpy) |
|---|---|---|---|---|
| 0 | — | 5.5 | 89 | — |
| 1 | 53 ± 1 | 6.8 | 10 | 4.7 ± 0.1 |
| 2 | 100 ± 5 | 6.9 | 9 | 4.7 ± 0.2 |
| 3 | 128 ± 12 | 6.6 | 27 | 3.8 ± 0.4 |
| 6 | 323 ± 5 | 6.7 | 23 | 4.7 ± 0.1 |
| | | | | Mean corr. rate 4.5 ± 0.5 |

It appears from Examples 384 through 388 that, unlike sodium chloride, 3% water solutions of sodium lactate do not show any signs of corrosion toward steel coupons. Moreover, sodium lactate acts as an efficient corrosion inhibitor, protecting steel from the corrosive effect of deionized water (see Example 388).

EXAMPLES 389 THROUGH 404

These Examples summarize the corrosion effects of organic acid salts, tested in Examples 71–184 and 245–304 as de-icing agents, at pH levels above the point of neutrality. All corrosion tests were performed with 3% w/w solutions of the salts, as described in the EXPERIMENTAL PROCEDURES, Section 9, and Examples 384 through 388. The data were obtained over a 2-, 3-, or 6-week period, and are listed in the Table below as mils per year.

TABLE 41

Corrosion rate (mpy) of 3% w/w solutions of organic acid salts and their compositions on cold rolled steel (C1018) coupons

| Example | Components (weight fraction, %) | Initial pH value | Average corrosion rate (mpy) |
|---|---|---|---|
| 389 | Potassium succinate | 8.0(8.7) | 0 |
| 390 | Sodium succinate | 8.0(9.1) | 0 |
| 391 | Potassium acetate | 7.9(8.9) | 0 |
| 392 | | 8.0(8.0) | 0 |
| 393 | Potassium lactate | 8.0(8.9) | 0 |
| 394 | | 8.0(6.6) | 0 |
| 395 | Sodium lactate | 7.8(8.5) | 0 |
| 387 | | 8.0(8.9) | 0 |
| 396 | Potassium lactate (95)-Potassium succinate (5) | 8.0(8.9) | 0 |
| 397 | Potassium lactate (90)-Potassium acetate (10) | 8.0(8.7) | 0 |
| 398 | Sodium lactate (93)-Sodium succinate (7) | 8.7(7.1) | 0 |
| 399 | Sodium lactate (90)-Potassium acetate (10) | 8.0(8.4) | 0 |
| 400 | Sodium lactate (94)-Sodium succinate (3)-Sodium acetate (3) | 8.0(8.9) | 0 |
| 401 | Sodium lactate (89)-Sodium succinate (3)-Sodium acetate (3)-Sodium formate (5) | 7.9(9.6) | 0 |
| 402 | Potassium lactate (85)-Potassium succinate (5)-Potassium acetate (5)-Potassium formate (5) | 7.9(7.4) | 0 |
| 403 | Sodium formate | 8.0(7.7) | 7.1 ± 2.6 |
| 404 | Sodium formate (90)-Sodium lactate (10) | 8.0(9.2) | 8.2 ± 1.0 |

It appears from these Examples that at pH levels slightly above neutrality, salts of some organic acids (lactates, succinates, acetates) do not show any detectable corrosive effects on steel coupons. Sodium formate (Example 403) presents an exception, and an addition of sodium lactate (10% of total solids in the composition) did not diminish the corrosive effect of formate (Example 404).

EXAMPLES 405 THROUGH 410

The procedure of Examples 384 through 404 was repeated, with the difference that the corrosion tests were performed with sodium chloride, calcium chloride, and with these chlorides in the presence of some organic acid salts. All corrosion tests were performed with 3% w/w solutions, as described in the EXPERIMENTAL PROCEDURES, Section 9, and Examples 384 through 404. The data were determined over a 3- or 6-week period, and are listed in the Table below as mils per year.

TABLE 42

Corrosion rate (mpy) of 3% w/w solutions of sodium chloride, calcium chloride, and those in the presence of organic acid salts, on cold rolled steel (C1018) coupons

| Example | Components (weight fraction, %) | Initial (final) pH value | Average corrosion rate (mpy) |
|---|---|---|---|
| 384 | Sodium chloride | 5.2(8.2) | 10.6 ± 2.8 |
| 385 | | 8.0(8.7) | 5.7 ± 0.7 |
| 405 | Sodium chloride (90)-Potassium succinate (10) | 5.9(8.8) | 7.7 ± 1.0 |
| 406 | Sodium chloride (97.5)-Potassium succinate (2.5%) | 6.1(7.9) | 4.3 ± 1.2 |
| 407 | Sodium chloride (90)-Sodium lactate (10) | 8.0(9.1) | 8.3 ± 1.8 |
| 408 | Calcium chloride | 8.1(6.5) | 5.6 ± 0.8 |
| 409 | | 8.0(7.0) | 6.3 ± 1.5 |
| 410 | Calcium chloride (90)-Sodium lactate (10) | 8.0(6.6) | 3.2 ± 1.0 |

It appears from these Examples that potassium succinate (weight fraction 2.5% to 10% of the solids) or sodium lactate (weight fraction 10% of the solids) do not appreciably inhibit steel corrosion by 3% w/w solution of sodium chloride at pH levels below neutrality (succinate) or above neutrality (lactate). However, it appears that sodium lactate at a weight fraction of 10% of the solids inhibits to some extent steel corrosion by 3% w/w solution of calcium chloride.

EXAMPLES 411 THROUGH 415

These Examples summarize the corrosion effects of 3% w/w solutions of sodium lactate, potassium acetate and their double salt compositions, obtained in Examples 1, 3, and 7 through 12, and tested in Examples 75 through 100 and 245 through 260 as de-icing agents. Evaluation of corrosion effects on cold rolled steel were performed as described in the EXPERIMENTAL PROCEDURES, Section 9, and Examples 384 through 388. The data were obtained over a 2- or 6-week period, and are listed in the Table below as mils per year.

TABLE 43

Corrosion rate (mpy) of 3% w/w solutions of sodium lactate, potassium acetate, and their compositions, on cold rolled steel (C1018) coupons

| Example | Sodium Lactate - Potassium Acetate (weight fraction, %) | Initial pH value | Average corrosion rate (mpy) |
|---|---|---|---|
| 386 | 100–0 (sodium lactate only) | 6.2 | 0 |
| 395 | | 7.8 | 0 |
| 387 | | 8.0 | 0 |
| 411 | 90–10 | 6.1 | 0.4 ± 0.1 (2 weeks) |
| 399 | | 8.0 | 0 |
| 412 | 80–20 | 7.9 | 0 |
| 413 | 50–50 | 8.0 | 0 |
| 414 | 20–80 | 7.9 | 0 |
| 415 | 10–90 | 8.0 | 0 |
| 391 | 0–100 (potassium acetate only) | 7.9 | 0 |
| 392 | | 8.0 | 0 |

It appears from these Examples that double salts of sodium lactate and potassium acetate as well as the both of the individual components do not show any noticeable corrosion effects on steel at the conditions of the tests (pH between 6 and 8, 3% w/w solutions).

J. Corrosion of Aluminum

EXAMPLES 416 THROUGH 419

These Examples describe typical tests for evaluation of corrosive effects, in these particular cases for 3% w/w solutions of sodium chloride, calcium chloride, sodium lactate, and potassium succinate, on aluminum alloy (A7075) coupons. Details of the test are described in the EXPERIMENTAL PROCEDURES, Section 9. In these Examples, exposure of aluminum coupons to the sodium chloride solution (Example 416) resulted in weight loss, and also in formation on the coupon surface of a heavy black layer, that was practically impossible to remove mechanically (by scraping) without damaging the integrity of the coupon. Exposure of aluminum coupons to the calcium chloride solution (Example 417) gave a different in kind pattern: while formation of a similar heavy black layer was observed, the coupons gained weight. After a two-week exposure the average weigh gain was +20±3 mg. Exposure to the sodium lactate solution (Example 418) led to weight loss, along with formation of a very light corrosion layer that was easily removable by just washing with water. Finally, potassium succinate did not produce any visible signs of corrosion, and after a 6-week exposure of aluminum coupons to a 3% solution of potassium succinate the coupons retained their brand-new and shiny look (Example 419).

TABLE 44

(to Example 416)
Evaluation of corrosion effects of 3% w/w solution of sodium chloride on aluminum (A7075) coupons (10.5 ± 0.5 g weight)

| Week | Average weight lost (mg) | PH | MV | Average corrosion rate (mpy) |
|---|---|---|---|---|
| 0 | — | 8.0 | −59 | — |
| 1 | 28 ± 4 | 9.4 | −142 | 8.0 ± 1.1 |
| 2 | 43 ± 1 | 8.7 | −98 | 5.7 ± 0.1 |
| 3 | 62 ± 1 | 8.9 | −110 | 5.1 ± 0.1 |
| 6 | 64 ± 5 | 9.0 | −119 | 2.4 ± 0.2 |
| | | | | Mean corr. rate 5.3 ± 2.2 (apparently, passivation) |

TABLE 45

(to Example 418)
Evaluation of corrosion effects of 3% w/w solution of sodium lactate on aluminum (A7075) coupons (10.5 ± 0.5 g weight)

| Week | Average weight lost (mg) | PH | MV | Average corrosion rate (mpy) |
|---|---|---|---|---|
| 0 | — | 7.8 | −47 | — |
| 1 | 56 ± 3 | 9.2 | −127 | 13.8 ± 0.7 |
| 2 | 95 ± 5 | 9.1 | −127 | 10.2 ± 0.5 |
| 3 | 118 ± 5 | 9.0 | −121 | 8.8 ± 0.4 |
| | | | | Mean corr. rate 10.9 ± 2.4 |

TABLE 46

(to Example 419)
Evaluation of corrosion effects of 3% w/w solution of potassium succinate on aluminum (A7075) coupons (10.5 ± 0.5 g weight)

| Week | Average weight lost (mg) | PH | MV | Average corrosion rate (mpy) |
|---|---|---|---|---|
| 0 | — | 8.0 | −52 | — |
| 1 | 0 | 8.3 | −74 | 0 |
| 2 | 0 | 8.4 | −82 | 0 |
| 4 | 0 | 8.7 | −97 | 0 |
| 6 | 0 | 9.2 | −130 | 0 |

EXAMPLES 420 AND 421

The procedure of Examples 416 through 419 was repeated, with the difference that tap water and deionized water (Milli-Q) were tested for their corrosive effect on structural aluminum for a period of two weeks.

TABLE 47

Evaluation of corrosion effects of tap water (initial apparent pH 7.7) and deionized water (initial apparent pH 5.8) on aluminum (A7075) coupons (10.5 ± 0.5 g weight)

| Week | Average weight lost (mg) | PH | MV | Average corrosion rate (mpy) |
|---|---|---|---|---|
| Example 420 Tap water | | | | |
| 0 | — | 7.7 | −48 | — |
| 2 | 31 ± 3 | 8.4 | −84 | 3.8 ± 0.4 |
| Example 421 Deionized water (Milli-Q) | | | | |
| 0 | — | 5.8 | −68 | — |

TABLE 47-continued

Evaluation of corrosion effects of tap water (initial apparent pH 7.7) and deionized water (initial apparent pH 5.8) on aluminum (A7075) coupons (10.5 ± 0.5 g weight)

| Week | Average weight lost (mg) | PH | MV | Average corrosion rate (mpy) |
|---|---|---|---|---|
| 2 | Gain +101 ± 9 | 7.6 | −36 | White powder layer formed, overall weight gain |

EXAMPLES 422 THROUGH 440

These Examples summarize the corrosion effects of organic acid salts, tested in Examples 71 through 159 and 245 through 288 as de-icing agents. All corrosion tests were performed with 3% w/w solutions of the salts, as described in the EXPERIMENTAL PROCEDURES, Section 9, and Examples 384 through 388. The data were determined over a 2-, 3-, 4-, or 6-week period, and are listed in the Table below as mils per year. In cases when the passivation phenomenon was observed—i.e., most of the weight loss occurred during the first week only—the average corrosion rate was not calculated, and the effect is noted in the Table.

TABLE 48

Corrosion rate (mpy) of 3% w/w solutions of organic acid salts and their compositions on aluminum (A7075) coupons

| Example | Components (weight fraction, %) | Initial (final) pH values | Average corrosion rate (mpy) |
|---|---|---|---|
| 422 | Potassium lactate | 5.7(9.0) | 12.5 ± 0.7 (2 weeks) |
| 423 | | 8.0(8.7) | 13.5 ± 1.2 (2 weeks) |
| 424 | Potassium lactate (90)-Imidazole (10) | 8.1(8.5) | 12.6 ± 1.3 (3 weeks) |
| 425 | Potassium lactate (95)-Potassium succinate (5) | 5.9(9.1) | 13.3 ± 0.6 (2 weeks) |
| 426 | Potassium lactate (90)-Potassium succinate (10) | 8.0(8.7) | 13.3 ± 1.5 (2 weeks) |
| 427 | Sodium lactate | 6.7(9.0) | 12.8 ± 0.4 (1 week) 8.4 ± 0.8 (2 weeks) |
| 418 | | 7.8(9.0) | 13.8 ± 0.7 (1 week) 10.2 ± 0.5 (2 weeks) 8.8 ± 0.4 (3 weeks) |
| 428 | Sodium lactate (95)-Imidazole (5) | 7.7(9.0) | 12.6 ± 0.3 (1 week) 12.4 ± 0.8 (2 week) 9.3 ± 0.2 (3 week) |
| 429 | Sodium lactate (90)-Imidazole (10) | 8.0(9.3) | 14.6 ± 0.3 (1 week) 12.4 ± 0.1 (2 week) 8.0 ± 0.1 (3 week) |
| 430 | Sodium lactate (85)-Imidazole (15) | 8.1(9.1) | 1 8.9 ± 0.8 (3 weeks) |
| 431 | Sodium lactate (97)-Sodium succinate (3) | 6.6(8.8) | 14.3 ± 0.3 (1 week) 7.6 ± 0.8 (2 week) |
| 432 | Sodium lactate (90)-Sodium succinate (10) | 8.0(9.0) | 12.1 ± 0.6 (1 week) 8.5 ± 0.5 (2 week) |
| 433 | Potassium formate | 8.0(9.6) | 2.9 ± 1.1 (2 weeks; heavy black layer) 3.7 ± 0.5 (4–6 weeks) |
| 434 | Sodium succinate | 6.5(7.3) | Passivation; 6 ± 1 mg weight loss from week 1 to week 6. Mpy drops from 1.2 to 0.2, accordingly |
| 435 | | 8.0(9.2) | 0 (1-3 weeks) 0.06 ± 0.04 (6 weeks) |
| 436 | Potassium succinate | 8.0(9.2) | 0 |
| 437 | Potassium acetate | 7.9(9.2) | Passivation; 2 ± 1 mg weight loss from week 1 to week 3. Mpy drops from 0.5 to 0.08, accordingly. |
| 438 | Sodium lactate (94)-Sodium succinate (3)-Sodium acetate (3) | 8.1(9.1) | 2.7 ± 0.2 (2 weeks) 4.4 ± 0.1 (4 weeks) 4.5 ± 0.1 (6 weeks) |
| 439 | Sodium lactate (89)-Sodium succinate (3)-Sodium acetate (3)-Sodium formate (5) | 8.0(9.1) | 3.0 ± 0.1 (1 week) 3.0 ± 0.1 (2 weeks) 3.5 ± 0.5 (4 weeks) 4.3 ± 0.3 (6 weeks) |
| 440 | Potassium lactate (85)-Potassium succinate (5)-Potassium acetate (5)-Potassium formate (5) | 8.0(8.7) | 2.6 ± 0.2 (2 weeks) 4.8 ± 0.7 (4 weeks) 5.3 ± 0.4 (6 weeks) |

It appears from these Examples that both potassium lactate and sodium lactate in 3% w/w concentration are corrosive towards aluminum under experimental conditions. Imidazole in the amount of 10% in relation to potassium lactate, and 5% to 15% in relation to sodium lactate does not inhibit the corrosion. However, additions of sodium succinate, sodium acetate, and sodium formate (in amounts of 3% to 5% of the total composition) significantly reduce corrosion effects.

It also appears that potassium acetate and sodium succinate produce only slight corrosive effects under the experimental conditions, as compared with most of other tested compounds. Potassium succinate was the best compound regarding corrosion of aluminum, and after 6 weeks of exposure of aluminum coupons to the aerated water solution, containing 3% w/w of potassium succinate, there was no any visible effect of corrosion.

EXAMPLES 441 THROUGH 445

These Examples summarize the corrosion effects of 3% w/w solutions of sodium lactate, potassium acetate and their double salt compositions, obtained in Examples 1, 3, and 7 through 12, tested in Examples 75 through 100 and 247 through 260 as de-icing agents. Evaluation of corrosion effects on aluminum alloy (A7075) has been done as described in the EXPERIMENTAL PROCEDURES, Section 9, and Examples 416 through 421. The data were obtained over a 2- to 6-week period, and are listed in the Table below as mils per year.

TABLE 49

Corrosion rate (mpy) of 3% w/w solutions of sodium lactate, potassium acetate, and their compositions, on aluminum (A7075) coupons

| Example | Sodium Lactate-Potassium Acetate (weight fraction, %) | Initial (final) pH values | Average corrosion rate (mpy) |
| --- | --- | --- | --- |
| 427 | 100–0 (sodium lactate only) | 6.7(9.0) | 12.8 ± 0.4 (1 week) 8.4 ± 0.8 (2 weeks) |
| 418 |  | 7.8(9.0) | 13.8 ± 0.7 (1 week) 10.2 ± 0.5 (2 weeks) 8.8 ± 0.4 (3 weeks) |
| 441 | 90–10 | 8.1(9.1) | 14.4 ± 1.6 (1 week) 12.3 ± 1.5 (2 weeks) |
| 442 | 80–20 | 7.9(9.4) | 10.7 ± 1.4 (2 weeks) |
| 443 | 50–50 | 8.0(9.2) | 10.6 ± 0.2 (1 week) 4.8 ± 0.5 (2 week) |
| 444 | 20–80 | 7.9(8.6) | 0.3 ± 0.1 (2 weeks) |
| 445 | 10–90 | 8.0(8.2) | 0.1 ± 0.1 (2 weeks) |
| 437 | 0–100 (potassium acetate only) | 7.9(9.2) | Passivation; 2 ± 1 mg weight loss from week 1 to week 3. Mpy drops from 0.5 to 0.08, accordingly. |

It appears from these Examples that double salts of sodium lactate and potassium acetate, containing 50% and higher fraction of potassium acetate in the compositions, reduce the corrosive effect on aluminum under the experimental conditions.

It is apparent from the above that new and unique compositions of de-icing chemicals, both in liquid form and impregnated within dry solid porous carriers, and having reduced corrosive effect on steel and aluminum have been disclosed. These liquid and solid de-icers are environmentally benign, biodegradable, efficient in ice melting, ice penetration, and ice undercutting, and are suitable for many applications, including de-icing and anti-icing of walkways, driveways, roadways and like structures, steel bridges, guard rails and other metal structures. The invention therefore provides, on one hand, new and effective de-icing materials, and on the other, new use for pulp and paper sludge that heretofore has primarily been burned or landfilled, creating environmental pressure.

Although this invention has been described in its preferred form and preferred practice with a certain degree of particularity, it is understood that the present disclosure of the preferred form and preferred practice has been made only by way of example and that numerous changes may be resorted to without departing from the spirit and the scope of the invention as hereinafter claimed.

What is claimed is:

1. A method of preventing or ameliorating ice formation, the method comprising the steps of:
   a. providing an aqueous solution of salts comprising 28% to 58% by weight of at least one alkali metal lactate, 0.3% to 10% by weight of at least one alkali metal succinate, 0.09% to 4.3% by weight of at least one alkali metal acetate, 0.15% to 2.5% by weight of at least one alkali metal formate, and water; and
   b. applying the solution to ice.

2. The method of claim 1 wherein salts each have a cation selected from the group consisting of sodium and potassium.

3. The method of claim 2 wherein the solution has a pH, the salts being formed according to steps comprising:
   a. providing an aqueous solution of lactic acid, acetic acid, succinic acid, and formic acid;
   b. neutralizing the mixture with at least one compound selected from the group consisting of sodium carbonate, sodium hydroxide, potassium carbonate, and potassium hydroxide; and
   c. adjusting the pH to a level ranging from about 7 to about 11.

4. A method of preventing or ameliorating ice formation, the method comprising the steps of:
   a. providing an aqueous solution of at least one organic acid salt selected from the group consisting of lactic acid salts, acetic acid salts, succinic acid salts, and formic acid salts; and
   b. applying the solution to ice,
wherein the solution has a pH, the salt being formed according to steps comprising:
   c. fermenting at least one sugar;
   d. concentrating the solution; and
   e. adjusting the pH to a level ranging from about 7 to about 11.

5. A method of preventing or ameliorating ice formation, the method comprising the steps of:
   a. providing solid granules having porous infrastructures, the granules being formed from pulp and paper sludge;
   b. providing an anti-icing composition comprising at least one salt of an organic acid, the composition being absorbable into the infrastructures of the solid granules;
   c. causing the anti-icing composition to be absorbed into the solid granules; and
   d. applying the granules to ice.

6. The method of claim 5 wherein the anti-icing composition comprises a liquid solution and further comprising the step of drying the granules following absorption therein of the liquid composition.

7. The method of claim 6 wherein the anti-icing composition is an aqueous solution of at least one organic acid salt.

8. The method of claim 7 wherein the salt is selected from the group consisting of lactic acid salts, acetic acid salts, succinic acid salts, and formic acid salts.

9. The method of claim 7 wherein the aqueous solution has a ratio of salt to water ranging from 30% w/w to 60% w/w.

10. The method of claim 5 wherein the granules have sizes ranging from 0.15 mm to 4 mm.

11. A method of preventing or ameliorating ice formation, the method comprising the steps of:
   a. providing an anti-icing composition comprising at least one salt of an organic acid;
   b. providing solid granules having porous infrastructures;
   c. causing the anti-icing composition to be absorbed into the solid granules; and
   d. applying the granules to ice,
wherein the solid granules contain calcium carbonate embedded therein, and the granules are exposed to an acid so as to cause reaction between the acid and the embedded calcium carbonate, the reaction forming an anti-icing composition comprising at least one calcium salt.

12. The method of claim 11 wherein the acid is selected from the group consisting of hydrochloric acid, nitric acid, and acetic acid.

13. A composition for preventing or ameliorating ice formation, the composition comprising solid granules having porous infrastructures, the granules being formed from pulp and paper sludge and having at least one anti-icing composition impregnated within the porous infrastructures, the anti-icing composition comprising at least one salt of an organic acid.

14. The composition of claim 13 wherein the granules have sizes ranging from 0.15 mm to 4 mm.

* * * * *